United States Patent
Seki et al.

(10) Patent No.: US 9,061,265 B2
(45) Date of Patent: Jun. 23, 2015

(54) HYDRODESULFURIZATION CATALYST FOR HYDROCARBON OIL, PROCESS OF PRODUCING SAME AND METHOD FOR HYDROREFINING

(75) Inventors: Hiroyuki Seki, Tokyo (JP); Masanori Yoshida, Tokyo (JP); Shogo Tagawa, Kitakyushu (JP); Tomoyasu Kagawa, Kitakyushu (JP)

(73) Assignees: JX Nippon Oil & Energy Corporation, Chiyoda-ku, Tokyo (JP); JGC Catalysts and Chemicals Ltd., Kawasaki-shi, Kanagawa (JP)

( * ) Notice: Subject to any disclaimer, the term of this patent is extended or adjusted under 35 U.S.C. 154(b) by 232 days.

(21) Appl. No.: 13/805,739

(22) PCT Filed: Jun. 21, 2011

(86) PCT No.: PCT/JP2011/064106
§ 371 (c)(1),
(2), (4) Date: Mar. 8, 2013

(87) PCT Pub. No.: WO2011/162228
PCT Pub. Date: Dec. 29, 2011

(65) Prior Publication Data
US 2013/0153467 A1  Jun. 20, 2013

(30) Foreign Application Priority Data

Jun. 25, 2010  (JP) ................................ 2010-145119
Jun. 25, 2010  (JP) ................................ 2010-145120

(51) Int. Cl.
*B01J 27/051* (2006.01)
*B01J 21/12* (2006.01)
(Continued)

(52) U.S. Cl.
CPC .............. *B01J 27/051* (2013.01); *B01J 21/063* (2013.01); *B01J 21/12* (2013.01); *B01J 23/882* (2013.01);
(Continued)

(58) Field of Classification Search
CPC ........ B01J 27/047; B01J 27/051; B01J 21/02; B01J 21/04; B01J 21/06; B01J 32/00
USPC .................. 502/216, 219–221, 232, 254, 255
See application file for complete search history.

(56) References Cited

U.S. PATENT DOCUMENTS 4,196,101 A  4/1980  Wilson et al.
(Continued)

FOREIGN PATENT DOCUMENTS

JP  54-104495 A  8/1979
(Continued)

OTHER PUBLICATIONS

Gates, B.C. et al. (1979). Chemistry of Catalytic Processes, McGraw-Hill, 464 pgs [Office action cites p. 250].*
(Continued)

*Primary Examiner* — Brian McCaig
(74) *Attorney, Agent, or Firm* — Panitch Schwarze Belisario & Nadel LLP

(57) ABSTRACT

A hydrodesulfurization catalyst is produced by pre-sulfurizing a hydrodesulfurization catalyst Y including a support containing silica, alumina and titania and at least one metal component supported thereon and selected from VIA and VIII groups of the periodic table (comprising at least Mo), in which the total area of the diffraction peak area indicating the crystal structure of anatase titania (101) planes and the diffraction peak area indicating the crystal structure of rutile titania (110) planes in the support, measured by X-ray diffraction analysis being ¼ or less of the alumina diffraction peak area assigned to γ-alumina (400) planes. The molybdenum is formed into molybdenum disulfide crystal disposed in layers on the support by the pre-sulfurization, and having an average length of longer than 3.5 nm and 7 nm or shorter in the plane direction and an average number of laminated layers of more than 1.0 and 1.9 or fewer.

12 Claims, 2 Drawing Sheets

AA···LAYER1
BB···LAYER2

(51) Int. Cl.
- *B01J 23/882* (2006.01)
- *B01J 27/19* (2006.01)
- *B01J 35/00* (2006.01)
- *B01J 37/00* (2006.01)
- *B01J 37/02* (2006.01)
- *B01J 37/20* (2006.01)
- *C10G 45/08* (2006.01)
- *B01J 27/047* (2006.01)
- *B01J 21/02* (2006.01)
- *B01J 21/04* (2006.01)
- *B01J 21/06* (2006.01)

(52) U.S. Cl.
CPC .............. *B01J 27/19* (2013.01); *B01J 35/0013* (2013.01); *B01J 37/0045* (2013.01); *B01J 37/0203* (2013.01); *B01J 37/20* (2013.01); *C10G 45/08* (2013.01); *C10G 2300/4018* (2013.01); *C10G 2300/1059* (2013.01); *C10G 2300/1074* (2013.01); *C10G 2300/202* (2013.01); *C10G 2300/207* (2013.01)

(56) References Cited

U.S. PATENT DOCUMENTS

| | | | |
|---|---|---|---|
| 6,267,874 | B1 | 7/2001 | Iijima et al. |
| 6,383,975 | B1 | 5/2002 | Rocha et al. |
| 6,656,349 | B1 | 12/2003 | Fujita et al. |
| 2003/0173256 | A1 | 9/2003 | Fujikawa et al. |
| 2006/0249429 | A1 | 11/2006 | Iki et al. |
| 2008/0017551 | A1 | 1/2008 | Kiriyama et al. |
| 2008/0280754 | A1 | 11/2008 | Toledo Antonio et al. |
| 2012/0181219 | A1 | 7/2012 | Seki et al. |

FOREIGN PATENT DOCUMENTS

| | | |
|---|---|---|
| JP | 05-184921 A | 7/1993 |
| JP | 10-118495 A | 5/1998 |
| JP | 11-319554 A | 11/1999 |
| JP | 2003-299960 A | 10/2003 |
| JP | 2005-254141 A | 9/2005 |
| JP | 2005-262063 A | 9/2005 |
| JP | 2005-262173 A | 9/2005 |
| JP | 2005-336053 A | 12/2005 |
| JP | 2008-239484 A | 10/2008 |
| JP | 2009-101362 A | 5/2009 |

OTHER PUBLICATIONS

Int'l Search Report issued Oct. 12, 2010 in Int'l Application No. PCT/JP2010/065785.
Koshika et al, "Keiyu CHoshindo Datsuryu Shokubai no Kaihatsu—Dai San Seibun Tenka Koka-", Idemitsu Giho, vol. 47, No. 3, pp. 301-307 (2004).
Gardner et al, "Performance of titania-supported nimo catalyst coatings on alumina extrudates for advanced hydroprocessing applications", Petroleum Chemistry Division Preprints, vol. 47, No. 1, pp. 73-76 (2002).
Office Action issued Mar. 6, 2014 in U.S. Appl. No. 13/498,165.
Int'l Search Report issued Aug. 30, 2011 in Int'l Application No. PCT/JP2011/064106.
Extended European Search Report issued May 13, 2014 in EP Application No. 11798112.6.
Office Action issued Aug. 19, 2014 in U.S. Appl. No. 13/498,165.

* cited by examiner

A A ··· LAYER1
B B ··· LAYER2

US 9,061,265 B2

HYDRODESULFURIZATION CATALYST FOR HYDROCARBON OIL, PROCESS OF PRODUCING SAME AND METHOD FOR HYDROREFINING

CROSS-REFERENCE TO RELATED APPLICATION

This application is a Section 371 of International Application No. PCT/JP2011/064106, filed Jun. 21, 2011, which was published in the Japanese language on Dec. 29, 2011, under International Publication No. WO 2011/162228 A1, and the disclosure of which is incorporated herein by reference.

TECHNICAL FIELD

The present invention relates to a hydrodesulfurization catalyst having a high desulfurization activity, used for hydrotreating hydrocarbon oils, a process of producing such a catalyst, and a method for hydrorefining hydrocarbon oils using the catalyst.

BACKGROUND ART

Recently, regulations on the sulfur contents of fuel oils have been tightened from environmental viewpoint. In particular, the sulfur contents of gasoline and gas oil have been subjected to more severe regulations. Under these circumstances, catalysts with a high desulfurization performance have been developed so as to cope with these regulations.

The active sites of a desulfurization catalyst are attributable to the sulfide of active metals supported on the support and presumably exist mostly edge portions of the crystal structure molybdenum disulfide taking a laminated structure (hereinafter referred to as "molybdenum disulfide layer"). For example, Patent Literature 1 discloses that a hydrotreating catalyst having molybdenum disulfide layers with an average number of laminated layer of 2.5 to 5 and an average value (average length) of 1 to 3.5 nm exhibits a high desulfurization performance for gas oil.

It is known that a titania support exhibits a higher desulfurization performance than an alumina support, and thus a hydrotreating catalyst including a titania support have been expected to be a catalyst meeting the demands. However, titania has a problem that it has a small specific surface area and low thermal stability at elevated temperatures. In order to solve this problem, a porous titania has been developed, which is produced by adding a growth inhibitor that inhibits particles from growing when calcined, to hydrosol or hydrogel of an aqueous titanium oxide or a dried product thereof and then drying and calcining the mixture (for examples, see Patent Literature 2). However, there is a problem that the sole use of the porous titania as a support increases the cost of the resulting catalyst. Therefore, a hydrotreating catalyst has also been developed, which comprises an alumina-titania support prepared by loading a water-soluble titania compound on an alumina support (for example, see Patent Literature 3). However, this hydrotreating catalyst can be less expensive but has a drawback that it can support titania only in an amount corresponding to the water absorption rate of titania and thus is poor in catalyst performances. Alternatively, a hydrotreating catalyst has also been developed, which comprises an alumina-titania support prepared by mixing titania in alumina so as to be highly dispersed therein upon preparation of the alumina (for example, see Patent Literature 4). However, this catalyst enables titania to be highly dispersed in alumina but has disadvantages that as the content of titania increases, crystallization thereof is likely to accelerate, resulting in a catalyst with a decreased specific surface area and a deteriorated sharpness of the pore distribution, causing a deterioration in catalyst performances.

CITATION LIST

Patent Literature

Patent Literature 1: Japanese Patent Application Publication No. 2003-299960
Patent Literature 2: Japanese Patent Application Publication No. 2005-336053
Patent Literature 3: Japanese Patent Application Publication No. 2005-262173
Patent Literature 4: Japanese Patent Application Publication No. 10-118495

SUMMARY OF INVENTION

Technical Problem

The present invention has an object to provide a hydrodesulfurization catalyst, which comprises a silica-alumina-titania support having titania highly dispersed therein, is low in production cost and can exhibit higher desulfurization performances, a process of producing such a catalyst, and a method for hydrorefining hydrocarbon oil with this catalyst.

Solution to Problem

As the results of extensive study and research, the present invention was accomplished on the basis of the finding that desulfurization for hydrocarbon oils is significantly improved by and the above object can be achieved by using a hydrodesulfurization catalyst for hydrorefining hydrocarbon oils, which is produced by pre-sulfurization of a hydrodesulfurization catalyst Y comprising a silica-titania-alumina support (hereinafter referred to as "silica-alumina-titania structure") having a specific structure, which metal components containing at least molybdenum is impregnated with and loaded on together with a chelating agent so that the average length of the molybdenum disulfide crystal layer is longer than 3.5 nm and 7 nm or shorter and the average number of the laminated layers is 1.0 or more and 1.9 or fewer (herein, the catalyst produced by pre-sulfurization may be referred to "pre-sulfurized catalyst" in order to distinguish it from the hydrodesulfurization catalyst Y prior to the pre-sulfurization).

That is, the present invention relates to a hydrodesulfurization catalyst for hydrocarbon oils, comprising a hydrodesulfurization catalyst Y comprising a support containing silica, alumina and titania and at least one type of metal component supported thereon and selected from VIA and VIII groups of the periodic table, the catalyst Y being pre-sulfurized, the total area (titania diffraction peak area) of the diffraction peak area indicating the crystal structure of anatase titania (101) planes and the diffraction peak area indicating the crystal structure of rutile titania (110) planes in the support, measured by X-ray diffraction analysis being ¼ or less of the diffraction peak area (alumina diffraction peak area) indicating the aluminum crystal structure assigned to γ-alumina (400) planes, the metal component comprising at least molybdenum, the molybdenum being formed into molybdenum disulfide crystal and disposed in layers on the support by the pre-sulfurization and the molybdenum disulfide crystal layers having an average length of longer than 3.5 nm and 7 nm or shorter in the plane direction and an average number of laminated layers of more than 1.0 and 1.9 or fewer.

The present invention also provides a process of producing a hydrodesulfurization catalyst for hydrocarbon oil, comprising:

(1) a first step of mixing a basic aluminum salt aqueous solution and a mixed aqueous solution of a titanium mineral acid salt and an acidic aluminum salt in the presence of silicate ion so that the pH is from 6.5 to 9.5 to produce a hydrate;

(2) a second step of producing a support by washing, extruding, drying and calcining the hydrate in turn;

(3) a third step of contacting the support with an impregnating solution containing at least one type of metal component selected from VIA and VIII groups of the periodic table (provided that molybdenum is indispensably contained) and a chelating agent;

(4) a fourth step of drying the support with the metal supported thereon, produced by contacting the support with the impregnating solution to produce a hydrodesulfurization catalyst Y; and (5) a fifth step of pre-sulfurizing the hydrodesulfurization catalyst Y, the total area (titania diffraction peak area) of the diffraction peak area indicating the crystal structure of anatase titania (101) planes and the diffraction peak area indicating the crystal structure of rutile titania (110) planes in the support, measured by X-ray diffraction analysis being ¼ or less of the diffraction peak area (alumina diffraction peak area) indicating the aluminum crystal structure assigned to γ-alumina (400) planes, the molybdenum being formed into molybdenum disulfide crystal and disposed in layers on the support by the pre-sulfurization, and the molybdenum disulfide crystal layers having an average length of longer than 3.5 nm and 7 nm or shorter in the plane direction and an average number of laminated layers of more than 1.0 and 1.9 or fewer, the impregnating solution having a peak intensity in the range of 940 to 950 $cm^{-1}$ 2.5 times or more of the peak intensity in the range of 890 to 910 $cm^{-1}$ in the Raman spectrum.

The present invention also relates to a method for hydrorefining hydrocarbon oil comprising hydrotreating hydrocarbon oils with the aforesaid hydrodesulfurization catalyst under a hydrogen atmosphere.

Advantageous Effects of Invention

The hydrodesulfurization catalyst (pre-sulfurized hydrodesulfurization catalyst) of the present invention has the crystal layers of molybdenum disulfide, which will be desulfurization active sites, having an average length in the plane direction of longer than 3.3 nm and 7 nm or shorter and an average number of laminated layers of more than 1.0 and 1.9 or fewer and therefore can be increased in desulfurization active site.

The process of producing the pre-sulfurized hydrodesulfurization catalyst of the present invention can highly disperse titanium in the support and as the result can produce an inexpensive but high performance catalyst using a relatively less amount of titanium, which is more expensive than alumina and silica.

Since the interaction between the molybdenum disulfide layers and the support can be weaken by chelating molybdenum, even the first layer of the molybdenum disulfide can exhibit a high desulfurization performance.

DESCRIPTION OF EMBODIMENTS

The present invention will be described in detail below.

The hydrodesulfurization catalyst for hydrocarbon oils of the present invention is a hydrodesulfurization catalyst where a hydrodesulfurization catalyst Y comprising at least one or more type of metal component (at least comprising molybdenum) selected from VIA and VIII groups of the periodic table supported on a silica-alumina-titania support having a specific structure is further pre-sulfurized so as to form molybdenum disulfide crystal layers with a specific structure.

The silica-alumina-titania support used for the hydrodesulfurization catalyst of the present invention is characterized in that the total area (hereinafter may be referred to as "titania diffraction peak area") of the diffraction peak area indicating the crystal structure of anatase titania (101) planes and the diffraction peak area indicating the crystal structure of rutile titania (110) planes in the support, measured by X-ray diffraction analysis is ¼ or less, preferably ⅕ or less, more preferably ⅙ or less of the diffraction peak area (hereinafter may be referred to as "alumina diffraction peak area") indicating the aluminum crystal structure assigned to γ-alumina (400) planes.

The titania diffraction peak area to the alumina diffraction peak area (titania diffraction peak area/alumina diffraction peak area) of ¼ or greater indicates progressing of crystallization of titania, resulting in decreased fine pores, which are effective for desulfurization. In this case, even though the amount of titania to be loaded on the support is increased, the resulting hydrodesulfurization catalyst cannot exhibit a desulfurization performance as balanced with the economic efficiency of the increased amount of titania and thus fails to be an inexpensive catalyst with a high performance.

The diffraction peak indicating the crystal structure of anatase titania (101) planes is measured at 2θ=25.5° while the diffraction peak indicating the crystal structure of rutile titania (110) planes is measured at 2θ=27.5°. The diffraction peak indicating the aluminum crystal structure assigned to γ-alumina (400) planes is measured at 2θ=45.9°.

Figure 3:
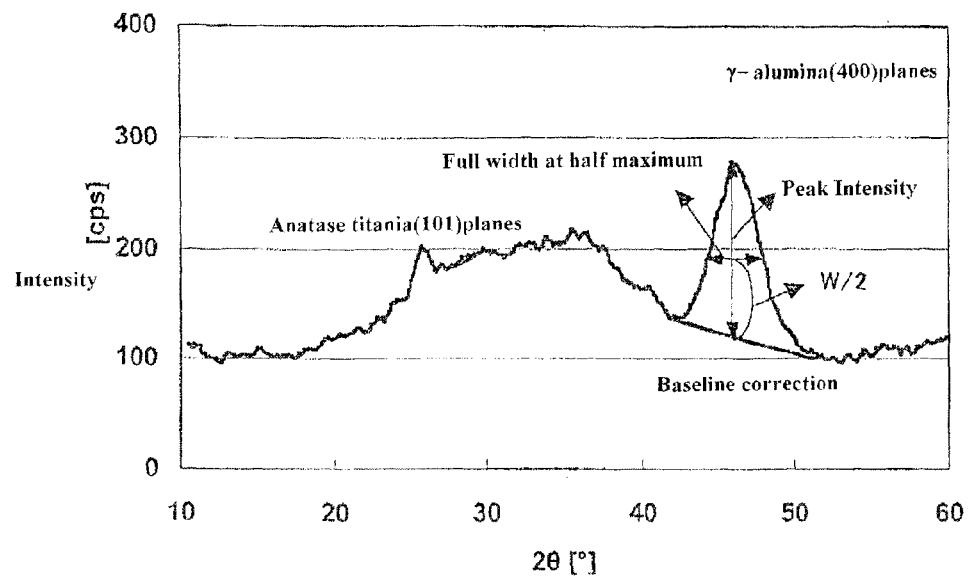
FIG. 3 is a chart indicating the X-ray diffraction analysis result of support a used in Example 1.

Each of the diffraction peak areas is calculated by fitting a graph obtained through X-ray diffraction analysis with an X-ray diffraction device, with a least square method, followed by baseline correction, and finding the height (peak intensity W) from the maximum peak value to the baseline so as to derive the peak width (full width at half maximum) when the resulting peak strength is half (W/2) thereby defining the product of the full width at half maximum and peak intensity as a diffraction peak area. "Titania diffraction peak area/ alumina diffraction peak area" is derived from each of the diffraction peak areas thus obtained (see FIG. 3).

The support contains silica in the form of $SiO_2$ in an amount of preferably 1 to 10 percent by mass, more preferably 2 to 7 percent by mass, more preferably 2 to 5 percent by mass on the support basis. A silica content of less than 1 percent by mass decreases the specific surface areas of the resulting catalyst and causes titania particles to be likely to aggregate upon calcination of the support carried out when the support is formed ("second step" described below, as the case may be), resulting in larger diffraction peak areas indicating the crystal structures of anatase titania and rutile titania measured by X-ray diffraction analysis. A silica content of more than 10 percent by mass causes the resulting support to be poor in sharpness of the pore distribution and thus possibly to fail to obtain a desired desulfurization activity.

The support contains titania in the form of $TiO_2$ in an amount of preferably 3 to 40 percent by mass, more preferably 15 to 35 percent by mass, more preferably 15 to 25 percent by mass on the support basis. A titania content of less than 3 percent by mass is too less in effect achieved by addition of titania, resulting in a catalyst that may not obtain a sufficient desulfurization activity. A titania content of more than 40 percent by mass is not preferable because not only the mechanical strength of the resulting catalyst is reduced but also the specific surface area is reduced due to the increased tendency for titania particles to accelerate in crystallization upon calcination of the support and thus the resulting catalyst may not exhibit a desulfurization performance corresponding to the economic efficiency according to the increased amount of titania, and may not be a catalyst, which is inexpensive and has high performances intended by the present invention.

The silica-titania-alumina support contains alumina in the form of $Al_2O_3$ in an amount of preferably 50 to 96 percent by mass, more preferably 58 to 83 percent by mass, more preferably 70 to 83 percent by mass on the support basis. An alumina content of less than 50 percent by mass is not preferable because the resulting catalyst tends to degrade significantly. An alumina content of more than 96 percent by mass is also not preferable because the catalyst performances tend to deteriorate.

The metal component(s) to be supported on the support is selected from Group VIA (IUPAC Group 6) and Group VIII (IUPAC Groups 8 to 10) of the periodic table. However, it is indispensable for the support to contain at least molybdenum.

Other than molybdenum, tungsten is preferably used as a metal component of Group VIA of the periodic table. Examples of metal components of Group VIII in the periodic table include cobalt and nickel.

The total content of metal component(s) selected from Groups VIA and VIII of the periodic table is preferably from 1 to 35 percent by mass, more preferably from 15 to 30 percent by mass in the form of oxide on the hydrodesulfurization catalyst Y basis. In this total content, the content of metal components (including molybdenum) of Group VIA of the periodic table is preferably from 1 to 30 percent by mass, more preferably from 13 to 24 percent by mass in the form of oxide while the content of metal components of Group VIII of the periodic table is preferably from 1 to 10 percent by mass, more preferably from 2 to 6 percent by mass in the form of oxide. The content of molybdenum to be supported as the indispensable component is preferably from 1 to 25 percent by mass, more preferably from 10 to 22 percent by mass in the form of oxide.

Next, the above-described hydrodesulfurization catalyst Y is pre-sulfurized to produce the pre-sulfurized hydrodesulfurization catalyst forming molybdenum disulfide crystal layers of a specific structure of the present invention.

The pre-sulfurization carried out in the present invention is a treatment wherein the above-described hydrodesulfurization catalyst Y is brought to contact with a mix oil of a hydrocarbon oil and a sulfating agent or hydrogen sulfide at a temperature of 200 to 400° C. so that the metal component(s) contained in the hydrodesulfurization catalyst Y is in a state of sulfide.

More specifically, the pre-sulfurization is carried out by contacting (1) the hydrodesulfurization catalyst Y with a mix oil of a petroleum distillate containing a sulfur compound (referred to as "hydrocarbon oil" in the present invention) and a sulfating agent or (2) the hydrodesulfurization catalyst Y with hydrogen sulfide, at a temperature of 200 to 400° C., preferably 240 to 340° C. under ordinary pressure or a hydrogen atmosphere of hydrogen partial pressure that is greater than ordinary pressure thereby producing a pre-sulfurized hydrodesulfurization catalyst.

A pre-sulfurization temperature of lower than 200° C. is not preferable because desulfurization activity would tend to degrade due to the lower degree of sulfurization of the supported metal. A pre-sulfurization temperature of higher than 400° C. is not also preferable because the number of the molybdenum disulfide crystal layers would be significantly increased and thus desulfurization activity would degrade. When the mix oil is brought into contact with the hydrodesulfurization catalyst Y, the initial temperature is preferably set at room temperature to 120° C. When the mix oil is brought into contact with the catalyst Y after the temperature exceeds 120° C., the effect of the chelating agent is reduced, likely resulting in the degraded desulfurization activity.

No particular limitation is imposed on the sulfating agent used for the pre-sulfurization. Examples of the sulfating agent include not only carbon disulfide and hydrogen sulfide, but also organic sulfur compounds such as thiophene, dimethyl sulfide, dimethyl disulfide, dioctyl polysulfide, dialkyl pentasulfide, dibutyl polysulfide, and mixtures thereof, and dimethyl sulfide, dimethyl disulfide, carbon disulfide, hydrogen sulfide are generally used.

The pre-sulfurized hydrodesulfurization catalyst of the present invention has a structure where molybdenum is formed into the crystal of molybdenum disulfide and disposed in layers on the support, by the above-described pre-sulfurization and the crystal layers of molybdenum disulfide has an average length in the plane direction of longer than 3.3 nm and 7 nm or shorter, preferably 3.6 nm or longer and 6.5 nm or shorter, more preferably 3.7 nm or longer and 5.5 nm or less and an average number of laminated layers of more than 1.0 and 1.9 or fewer, preferably 1.1 or more and 1.7 or fewer, more preferably 1.2 or more and 1.5 or fewer.

When the average length in the plane direction of the molybdenum disulfide layers is 3.5 nm or shorter, the molybdenum disulfide is reduced in crystallinity and susceptible to interaction with the support. When the average length is 7 nm or longer, the resulting pre-sulfurized catalyst is adversely fewer in the number of active sites and thus fails to exhibit a high desulfurization activity. When the average number of laminated layers of the molybdenum disulfide layers is more than 1.9, the resulting catalyst fails to exhibit a sufficient desulfurization performance because the molybdenum disulfide is not highly dispersed.

A process of producing the pre-sulfurized hydrodesulfurization catalyst of the present invention will be described next.

The process of producing the hydrodesulfurization catalyst of the present invention comprises: a first step of mixing a mixed aqueous solution of titanium mineral acid salt and acidic aluminum salt (hereinafter simply referred to as "mixed aqueous solution") and a basic aluminum salt aqueous solution in the presence of silicate ion so that the pH is from 6.5 to 9.5 to produce a hydrate; a second step of producing a support by washing, extruding, drying and calcining the hydrate in turn; a third step of contacting the support with an impregnating solution containing at least one type of metal component selected from VIA and VIII groups of the periodic table (provided that the metal component indispensably comprises molybdenum) and a chelating agent; and a fourth step of drying the support with the metal supported thereon, resulting from the contact with the impregnating solution to produce a hydrodesulfurization catalyst Y. Each of the steps will be described below.

(First Step)

First of all, in the presence of silicate ion, a mixed solution of a titanium mineral acid salt and an acidic aluminum salt (this is an acidic aqueous solution) is mixed with a basic aluminum salt aqueous solution (this is an alkaline aqueous solution) such that the pH is from 6.5 to 9.5, preferably from 6.5 to 8.5, more preferably from 6.5 to 7.5 thereby producing a hydrate containing silica, titania and alumina.

In this step, there are two alternative cases (1) where a mixed aqueous solution is added to a basic aluminum salt aqueous solution containing silicate ion and (2) where a basic aluminum salt aqueous solution is added to a mixed solution containing silicate ion.

In case (1), silicate ion contained in a basic aluminum aqueous solution may be basic or neutral. Basic silicate ion sources may be silicic acid compounds such as sodium silicate, which can generate silicate ions in water. In case (2), silicate ion contained in a mixed aqueous solution of a titanium mineral acid salt and an acidic aluminum salt aqueous solution may be acidic or neutral. Acidic silicate sources may be silicic acid compounds such as silicic acid, which can generate silicate ions in water.

Examples of the basic aluminum salt include sodium aluminate and potassium aluminate. Examples of the acidic aluminum salt include aluminum sulfate, aluminum chloride, and aluminum nitrate. Examples of the titanium mineral acid salt include titanium tetrachloride, titanium trichloride, titanium sulfate, and titanium nitrate. In particular, titanium sulfate is preferably used because it is inexpensive.

For example, a predetermined amount of a basic aluminum salt aqueous solution containing basic silicate ion is charged into a tank with a stirrer and heated and maintained to a temperature of usually 40 to 90° C., preferably 50 to 70° C., and to the solution was continuously added a predetermined amount of a mixed aqueous solution of a titanium mineral acid salt and acidic aluminum salt aqueous solution heated to a temperature of ±5° C., preferably ±2° C., more preferably ±1° C. of the basic aluminum salt aqueous solution for usually from 5 to 20 minutes, preferably from 7 to 15 minutes so that the pH is from 6.5 to 9.5, preferably from 6.5 to 8.5, more preferably from 6.5 to 7.5 to produce a precipitate, which is a slurry of hydrate. It is noted that since addition of the basic aluminum salt aqueous solution to the mixed solution for a too long period of time would cause the production of crystals of pseudoboehmite, bayerite or gibbsite, which are not preferable, the addition is carried out for desirously 15 minutes or shorter, more desirously 13 minutes or shorter. Bayerite and gibbsite are not preferable because they reduce the specific surface area after calcination.

(Second Step)

The hydrate slurry produced in the first step is aged if necessary and then washed to remove the by-produced salts thereby producing a hydrate slurry containing silica, titania and alumina. The resulting hydrate slurry is further heated and aged if necessary and then formed into an extrudable kneaded product by a conventional method, such as heat-kneading. The extrudable product is extruded into a desired shape by extrusion and then dried at a temperature of 70 to 150° C., preferably 90 to 130° C. and calcined at a temperature of 400 to 800° C., preferably 450 to 600° C. for 0.5 to 10 hours, preferably 2 to 5 hours thereby producing a silica-titania-alumina support.

(Third Step)

The resulting silica-alumina-titania support is brought into contact with an impregnating solution containing at least one type of metal component selected from VIA and VIII groups of the periodic table (provided that the metal component indispensably contains molybdenum) and a chelating agent.

Raw materials of the metal component are preferably molybdenum trioxide molybdenum, ammonium molybdate, ammonium metatungstate, ammonium paratungstate, tungsten trioxide, nickel nitrate, nickel carbonate, cobalt nitrate and cobalt carbonate.

The chelating agent may be, for example, citric acid, malic acid, tartaric acid, ethylenediaminetetraacetic acid (EDTA), diethylenetriamine-pentaacetic acid (DTPA), polyethylene glycol (PEG) and tetraethylene glycol (TEG). In particular, citric acid and malic acid are preferably used.

The chelating agent is contained in an amount of preferably 35 to 75 percent by mass, more preferably 55 to 65 percent by mass of the molybdenum oxide. An amount of the chelating agent of more than 75 percent by mass of the molybdenum is not preferable because the impregnating solution containing the metal component(s) is increased in viscosity and thus makes it difficult to carry out the impregnation step in the process. An amount of less than 35 percent by mass is not also preferable because the impregnating solution is deteriorated in stability and further the catalyst performance tends to degrade.

In addition to the chelating agent, the impregnating solution preferably contains a phosphoric compound. The chelating agent and phosphoric compound may be contacted with the support with a conventional manner (impregnation, immersion).

The phosphoric compound is preferably orthophosphoric acid (hereinafter may be simply referred to as "phosphoric acid"), ammonium dihydrogenphosphate, ammonium phosphate dibasic, trimetaphosphoric acid, pyrophosphoric acid, and tripolyphosphoric acid, more preferably orthophosphoric acid.

The phosphoric compound is contained in an amount of preferably 3 to 25 percent by mass, more preferably 5 to 15 percent by mass on an oxide basis of the molybdenum oxide. A phosphoric compound content of more than 25 percent by mass of the molybdenum oxide is not preferably because the resulting pre-sulfurized hydrodesulfurization catalyst would be deteriorated in its performance. A phosphoric compound content of less than 3 percent by mass is not also preferable because the impregnating solution would be poor in stability.

No particular limitation is imposed on the method for including the above-described metal component, chelating agent or further phosphoric compound into the support. Any conventional method such as impregnation (equilibrium adsorption, pore filling, incipient wetness impregnation methods) or ion-exchange may be used. Impregnation referred herein is a method wherein the support is impregnated with an impregnating solution containing active metals and then dried. In the impregnation method, metal components are preferably loaded at the same time. When metal components are loaded separately, the resulting catalyst would be insufficient in desulfurization activity or denitrogenation activity.

In the Raman spectrum, the impregnating solution has a peak intensity in the range of 940 to 950 $cm^{-1}$ 2.5 times or more of the peak intensity in the range of 890 to 910 cm$^{-1}$ (hereinafter the ratio of the peak intensity in the range of 940 to 950 cm$^{-1}$ to the peak intensity in the range of 890 to 910 cm$^{-1}$ is referred to as "peak intensity ratio"). In the Raman spectrum, the peak within the range of 940 to 950 cm$^{-1}$ is derived from the heptamer of molybdenum, i.e., $Mo_7O_{24}^{6-}$ while the peak within the range of 890 to 910 cm$^{-1}$ is derived from the monomer of molybdenum, i.e., $MoO^{4-}$. When the peak intensity ratio of the Raman spectrum is less than 2.5 times, the ratio of the molybdenum monomer is increased. In this case, the molybdenum monomer has a strong interaction with the support, and thus the resulting pre-sulfurized hydrodesulfurization catalyst is decreased in the degree of sulfurization of molybdenum and fails to exhibit high desulfurization activity.

The impregnating solution is adjusted to 5 or less pH with acid so as to dissolve the metal component(s). Whereby, the ratio of the oligomer molybdenum in the impregnating solution can be increased and make the peak intensity ratio 2.5 times or more. When the peak intensity ratio is less than 2.5 times, the ratio of the molybdenum monomer is increased. Since the molybdenum monomer interacts strongly with the support, it becomes lower in degree of sulfurization than the molybdenum oligomer upon pre-sulfurization of the hydrodesulfurization catalyst Y, and the pre-sulfurized hydrodesulfurization catalyst possibly fails to exhibit high desulfurization activity.

Figure 4:
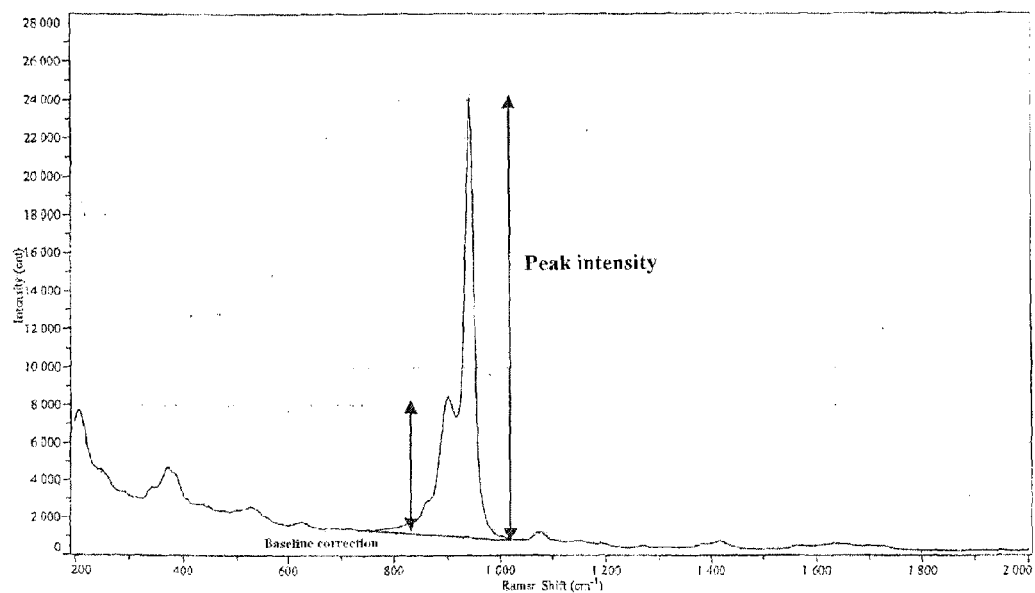
FIG. 4 is a chart indicating the Raman spectroscopic analysis of impregnating solution a used in Example 1.

Each peak intensity is calculated by fitting a graph obtained through Raman spectroscopic analysis (Raman spectrum), with a least square method, followed by baseline correction, and finding the height from the maximum peak value to the baseline (see FIG. 4).

Generally, molybdenum in an aqueous solution exists in the form of $MoO^{4-}$ in the region where the pH is from 7 to 9, and the peaks assignable to the Td symmetrical ion of $MoO^{4-}$ can be found at 898 cm$^{-1}$, 842 cm$^{-1}$ and 320 cm$^{-1}$ in the Raman spectrum. In the region where the pH is from 1 to 5, the changes of the monomer ion, i.e., $MoO^{4-}$ to $Mo_7O_{24}^{6-}$ and $H_nMo_7O_{24}^{(6-n)-}$, the formation of $Mo_8O_{27}^{4-}$ and the emergence of $Mo_6O_{19}^{2-}$ have been found. The spectrum band is located at 960 cm$^{-1}$ (assignable to the stretching vibration of Mo—O) and 980 cm$^{-1}$, assignable to the molybdenum oligomer. The spectrum band having a feature in respect of $No_7O_{24}^{6-}$ is located at 218 to 222 cm$^{-1}$, 360 cm$^{-1}$ and 944 cm$^{-1}$.

(Fourth Step)

The support supporting the metal component(s), produced by the contact with the impregnating solution in the third step is dried at a temperature of 200° C. or lower, preferably from 110 to 150° C. for 0.5 to 3 hours, preferably 1 to 2 hours thereby producing the hydrodesulfurization catalyst Y.

Calcination or drying at a temperature of higher than 200° C. is not preferable because the chelating agent thermally cracks and thus the supported metal component(s) condense.

Next, the hydrodesulfurization catalyst Y produced in the fourth step is pre-sulfurized in a reactor thereby producing the pre-sulfurized hydrodesulfurization catalyst of the present invention (fifth step).

That is, in the fifth step, the pre-sulfurization is carried out by contacting (1) the hydrodesulfurization catalyst Y with a mix oil of a petroleum distillate containing a sulfur compound (referred to as "hydrocarbon oil" in the present invention) and a sulfating agent (for example, dimethyl sulfide, dimethyl disulfide, and carbon disulfide) or (2) the hydrodesulfurization catalyst Y with hydrogen sulfide, at a temperature of 200 to 400° C., preferably 240 to 340° C. under ordinary pressure or a hydrogen atmosphere of hydrogen partial pressure that is greater than ordinary pressure thereby producing a pre-sulfurized hydrodesulfurization catalyst.

A pre-sulfurization temperature of lower than 200° C. is not preferable because the degree of sulfurization of the supported metal(s) is low and the resulting catalyst tends to be reduced in desulfurization activity. A pre-sulfurization temperature of higher than 400° C. is not also preferable because the number of layer of the molybdenum disulfide crystal laminated layer would be significantly increased and thus desulfurization activity would degrade. When the mix oil is brought into contact with the catalyst Y after the temperature exceeds 120° C., the effect of the chelating agent is reduced, likely resulting in the degraded desulfurization activity.

After completion of the pre-sulfurization, the pre-sulfurized hydrodesulfurization catalyst is cooled to room temperature and preserved under a nitrogen atmosphere.

By the above-described pre-sulfurization, molybdenum is formed into molybdenum disulfide crystals and disposed in layers on the support and the molybdenum disulfide crystal layer has an average length of loner than 3.5 nm and 7 nm or shorter in the plane direction of the crystal layer and an average number of laminated layers of more than 1.0 and 1.9 or fewer.

The average number of layers and length of the molybdenum disulfide crystal layer are the values determined by the following methods.

After completion of pre-sulfurization, the pre-sulfurized hydrodesulfurization catalyst is cooled to room temperature and then preserved under a nitrogen atmosphere. Part of the pre-sulfurized hydrodesulfurization catalyst is pulverized to for example 20 mesh or smaller, and a photograph of the resulting powder is taken with a transmission electron microscope (TEM) (see FIG. 1).

The average number of laminated layers of the molybdenum disulfide crystal layer in the pre-sulfurized hydrodesulfurization catalyst is determined by measuring the number laminated layer N of for example 20, preferably 50, more preferably 100 or more of the molybdenum disulfide layers from the TEM photograph (see FIG. 2) and averaging out the number.

Similarly to the average number of laminated layers, the length of the molybdenum disulfide layer is determined by measuring the lengths of the molybdenum disulfide layers from the TEM photograph and averaging out the lengths.

The method for hydrorefining hydrocarbon oils of the present invention is carried out by hydrotreating hydrocarbon oils under a hydrogen atmosphere using the above-described pre-sulfurized hydrodesulfurization catalyst. No particular limitation is imposed on the hydrotreating. However, it is usually carried out in a circulation type fixed bed reactor into which the catalyst is filled at elevated temperature and pressure under a hydrogen atmosphere.

Examples of the hydrocarbon oil used in the present invention include straight-run gas oil or straight-run kerosene produced through an atmospheric distillation unit for crude oil; vacuum gas oil produced by distilling straight heavy oil or residue obtained from an atmospheric distillation unit, in a vacuum distillation unit; light cycle kerosene or gas oil produced by fluid catalytic-cracking vacuum heavy gas oil or desulfurized heavy oil; hydrocracked kerosene or gas oil produced by hydrocracking vacuum heavy gas oil or desulfurized heavy oil; and thermal-cracked kerosene or gas oil obtained through a thermal cracking unit such as a coker, all of which are fractions containing 80 percent by volume or more of a fraction whose boiling point is from 180 to 360° C. No particular limitation is imposed on oils to be treated in an atmospheric distillation unit. Examples of such oils include petroleum crude oil, synthetic crude oil derived from oil sand, liquefied coal oil, and bitumen reformed oil.

The value of the distillation characteristics (boiling point) referred herein is measured in accordance with the method described in JIS K2254 "Petroleum products-Determination of distillation characteristics".

No particular limitation is imposed on the reaction pressure (hydrogen partial pressure), which is, however, preferably from 1 to 12 MPa. At a reaction pressure of lower than 1 MPa, desulfurization and denitrogenation activities tend to significantly decrease. The reaction pressure is thus preferably 1 MPa or higher, more preferably 3 MPa or higher. A reaction pressure of higher than 12.0 MPa is not preferable in terms of economic efficiency because desulfurization activity does not change and hydrogen consumption increases, resulting in a higher running cost. The reaction pressure is thus preferably 12 MPa or lower, more preferably 10 MPa or lower, more preferably 70 MPa or lower.

No particular limitation is imposed on the liquid-space velocity, which is, however, preferably from 0.1 to 4.0 $h^{-1}$, more preferably from 0.5 to 2.0 $h^{-1}$. A liquid-space velocity of less than 0.1 $h^{-1}$ is not practical because the productivity is reduced due to the reduced amount of throughput. A liquid-space velocity of greater than 4.0 $h^{-1}$ is not preferable because the decomposition of the catalyst accelerates.

No particular limitation is imposed on the hydrogen/oil ratio, which is, however, is preferably from 80 to 500 NL/L, more preferably from 150 to 350 NL/L. A hydrogen/oil ratio of less than 80 NL/L is not preferable because the desulfurization activity tends to significantly decrease. A hydrogen/oil ratio of greater than 500 NL/L is not also preferable because it cannot change the desulfurization activity and only increases the running cost.

No particular limitation is imposed on the reaction temperature, which is, however, preferably from 250 to 400° C., more preferably from 300 to 380° C. A reaction temperature of lower than 250° C. is not practical because desulfurization and denitrogenation activities tend to significantly deteriorate. A reaction temperature of higher than 400° C. is not preferable because the catalyst is drastically decomposed and the catalyst life is shortened.

The oil produced by hydrotreating of a hydrocarbon oil according to the present invention has a sulfur content of preferably 10 ppm by mass or less, more preferably 8 ppm by mass or less, more preferably 7 ppm by mass or less. The oil has a nitrogen content of preferably 3 ppm by mass or less, more preferably one ppm by mass. The present invention can decrease significantly the sulfur and nitrogen contents of the produced oil by hydrotreating a hydrocarbon oil using the above-described specific hydrodesulfurization catalyst.

The sulfur content (sulfur concentration) referred herein is measured in accordance with the method described in JIS K2541 "Determination of sulfur content". The nitrogen content (nitrogen concentration) referred herein is measured in accordance with the method described in JIS K2609 "Determination of nitrogen content".

EXAMPLES

The present invention will be described in more details with reference to the following examples but is not limited thereto.

Example 1

Preparation of Pre-Sulfurized Hydrodesulfurization Catalyst A (First Step)

Into a 100 L volume tank equipped with a steam jacket were put 8.16 kg of an aqueous solution containing sodium aluminate in an amount of 22 percent by mass on an $Al_2O_3$ concentration basis. The solution was diluted with 41 kg of ion-exchange water, to which 1.80 kg of a solution containing sodium silicate in an amount of 5 percent by mass on an $SiO_2$ concentration basis were then added, stirring. The resulting mixture was heated at a temperature of 60° C. thereby preparing a basic aluminum salt aqueous solution. An acidic aluminum salt aqueous solution was prepared by diluting 7.38 kg of an aqueous solution containing aluminum sulfate in an amount of 7 percent by mass on an $Al_2O_3$ concentration basis with 13 kg of ion-exchange water while a titanium mineral acid salt aqueous solution was prepared by dissolving 1.82 kg of 33 percent by mass on a $TiO_2$ concentration basis of titanium sulfate in 10 kg of ion-exchange water. These aqueous solutions were mixed and heated to a temperature of 60° C. thereby preparing a mixed aqueous solution. This mixed aqueous solution was added at a constant rate (addition time: 10 minutes) into the tank containing therein the basic aluminum salt aqueous solution using a roller pump until the pH was 7.2 thereby preparing hydrate slurry a containing silica, titania, and alumina.

(Second Step)

The resulting hydrate slurry a was aged, stirring at a temperature of 60° C. for one hour, and then dewatered with a flatsheet filter and washed with 150 L of a 0.3 percent by mass ammonium aqueous solution. After washing, the resulting cake-like slurry was diluted with ion-exchange water so that the amount of the slurry was 10 percent by mass on an $Al_2O_3$ concentration basis and then adjusted in pH to 10.5 with 15 percent by mass of ammonium water. The slurry was transferred to an aging tank with a reflux condenser and aged, stirring at a temperature of 95° C. for 10 hours. The resulting slurry was dewatered and then concentrated and kneaded to have a certain moisture level with a double-armed kneader with a steam jacket. The resulting kneaded product was extruded into a cylindrical shape with a diameter of 1.8 mm with an extruder and dried at a temperature of 110° C. The dried extruded products were calcined at a temperature of 550° C. in an electric furnace for 3 hours thereby producing silica-alumina-titania support a (hereinafter, simply referred to as "support a", as the case may be). Support a contained silica in an amount of 3 percent by mass on an $SiO_2$ concentration basis (hereinafter also referred to as "$SiO_2$ concentration of 3 percent by mass", as the case may be), titania in an amount of 20 percent by mass on a $TiO_2$ concentration basis, and aluminum in an amount of 77 percent by mass on an $Al_2O_3$ concentration basis, all on the support basis.

Support a was subjected to X-ray diffraction analysis with an X-ray diffraction apparatus "RINT 2100" manufactured by Rigaku Corporation (as the case may be). The results are set forth in FIG. 3. Least square fitting was applied to the resulting graph, followed by baseline correction so as to find the full width at half maximum of the peak assigned to the anatase titania (101) planes indicated at 2θ=25.5°. The product of the full width at half maximum and the peak intensity from the baseline to the maximum peak was defined as an anatase titania diffraction peak area. The same procedures were carried out to find the full width at half maximum of the peak assigned to the rutile titania (110) planes indicated at 2θ=27.5°, and the product of the full width at half maximum and the peak intensity from the baseline was defined as a rutile titania diffraction peak area. The total of the anatase titania diffraction peak area and rutile titania diffraction peak area was defined as a titania diffraction peak area. It is noted that no rutile titania peak was not detected in Support a. Furthermore, the full width at half maximum of the peak assigned to the γ-alumina (400) planes indicated at 2θ=45.9° was also found, and the product of the full width at half maximum and the peak intensity from the baseline was defined as an alumina diffraction peak area. For support a, the diffraction peak area indicating the crystal structures of the anatase titania and rutile titania was ⅛ of the diffraction peak area of the crystal structure assigned to aluminum (titania diffraction peak area/ alumina diffraction peak area=⅛, as the case may be).

(Third Step)

Next, 248 g of molybdenum trioxide and 98 g of cobalt carbonate were suspended in 500 ml of ion-exchanged water, and then heated at a temperature of 95° C. for 5 hours, applying a suitable reflux treatment so that the volume is not decreased, followed by dissolving of 147 g of citric acid in the suspension thereby preparing impregnating solution a. Impregnating solution a had a pH of 1.7.

Impregnating solution a was subjected to the Raman spectroscopic analysis with a microscopic laser Raman spectrophotometer "LabRAM ARAMIS" manufactured by HORIBA, Ltd. (as the case may be). The results are shown in FIG. 4. The resulting graph was subjected to fitting with the least-square method and then baseline correction thereby defining heights from the maximum peak values around 945 $cm^{-1}$ and 900 $cm^{-1}$ to the baseline as peak intensities. Impregnating solution a had a peak intensity around 945 $cm^{-1}$ 3.1 times of the peak intensity around 900 $cm^{-1}$ (that is, the peak intensity ratio was 3.1).

(Fourth Step)

After 1000 g of support a was impregnated with impregnating solution a by spray, it was dried at a temperature of 110° C. thereby producing a hydrodesulfurization catalyst a (hereinafter, simply referred to as "catalyst a", as the case may be). The metal component contents of catalyst a were 19 percent by mass of molybdenum in the form of $MoO_3$ (hereinafter also referred to as "$MoO_3$ concentration of 19 percent by mass") and 4.5 percent by mass of cobalt in the form of COO, all on the catalyst a basis.

(Fifth Step)

After 200 ml of the resulting catalyst a was filled into a circulation type fixed bed reactor, it was pre-sulfurized. The pre-sulfurization was carried out by feeding a mix oil of a straight-run gas oil and dimethyl disulfide, whose sulfur content was adjusted to 2.0 percent by weight at room temperature and maintaining the mix oil under conditions of a pressure of 5.0 MPa, a liquid-space velocity of 2.0 $h^{-1}$, a hydrogen/oil ratio of 200 NL/L, and a temperature of 250° C. for 8 hours and further at a temperature of 320° C. for 5 hours thereby producing pre-sulfurized hydrodesulfurization catalyst A (hereinafter, simply referred to as "catalyst A", as the case may be). Properties of catalyst A are set forth in Table 1 below.

Figure 1:
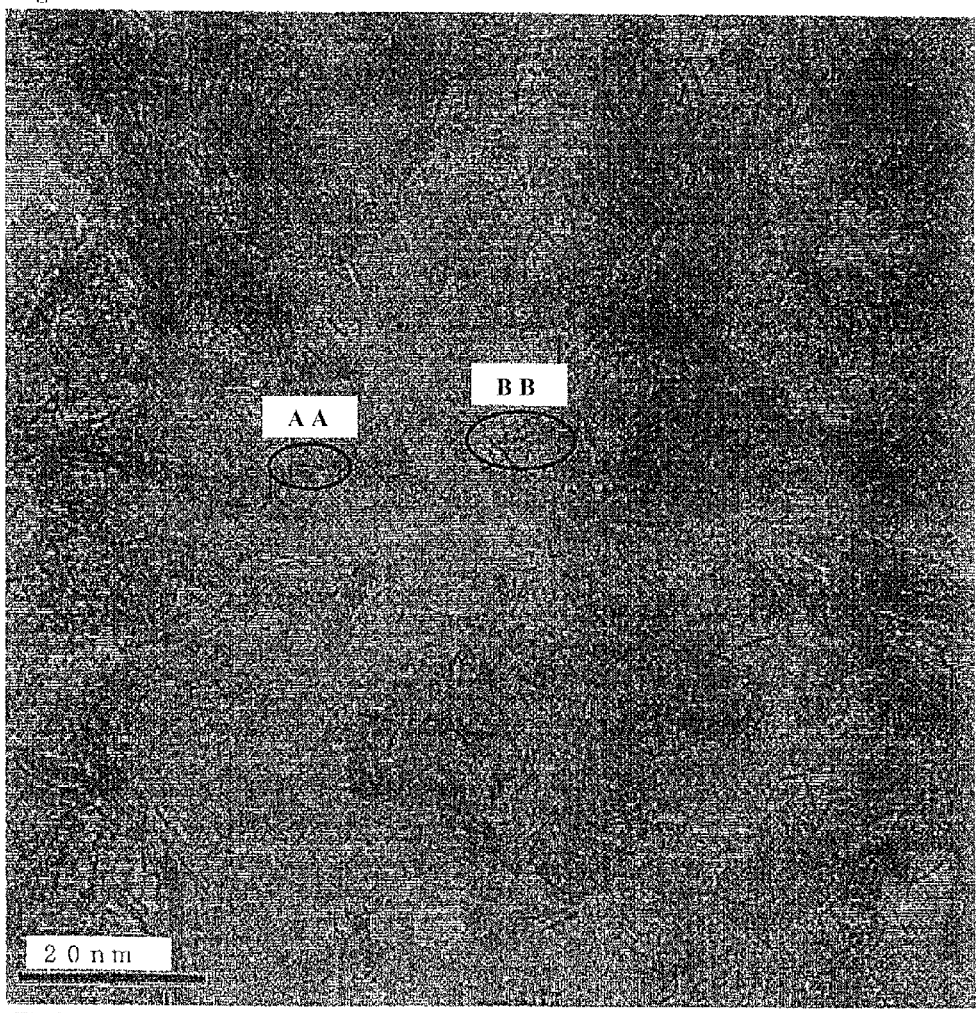
FIG. 1 is a photograph of catalyst A in Example 1 taken with a transmission electron microscope.
Figure 2:
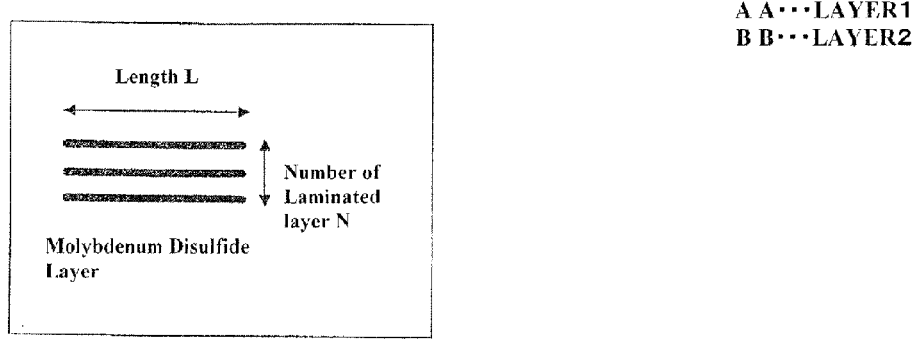
FIG. 2 is an image view indicating the number and length in the plane direction of the crystal layer of molybdenum disulfide.

A TEM photograph of catalyst A was taken with a transmission electron microscope H-800 manufactured by Hitachi, Ltd. (as the case may be). The results are shown in FIG. 1. From the resulting TEM photographs, 50 molybdenum disulfide layers were observed to measure the number of laminated layers and length for each molybdenum disulfide layer and calculate the average number of laminated layer and the average length. The molybdenum disulfide layers of catalyst A had an average number of laminated layers of 1.3 and an average length of 4.8 nm. The definitions of the number of laminated layers N and length L of molybdenum disulfide are shown in FIG. 2.

Example 2

Preparation of Pre-Sulfurized Hydrodesulfurization Catalyst B

This example is different from Example 1 in that hydrate slurry b was prepared by adding at a constant rate to (1) a basic aluminum salt aqueous solution prepared by diluting 8.67 kg of an aqueous solution containing 22 percent by mass on an $Al_2O_3$ concentration basis of sodium aluminate with 37 kg of ion-exchanged water and adding thereto, stirring 0.60 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 10.90 kg of an aqueous solution containing 7 percent by mass on an $Al_2O_3$ concentration basis of aluminum sulfate with 20 kg of ion-exchanged water and a titanium mineral acid salt aqueous solution prepared by dissolving 0.91 kg of 33 percent by mass on a $TiO_2$ concentration basis of titanium sulfate in 5 kg of ion-exchanged water, until the pH was 7.2.

In the same manner as Example 1, support b was prepared from hydrate slurry b. Support b had an $SiO_2$ concentration of 1 percent by mass, a $TiO_2$ concentration of 10 percent by mass, and an $Al_2O_3$ concentration of 89 percent by mass, all on the support basis.

As the result of X-ray diffraction analysis carried out as with Example 1 (not shown, as the case may be), the titania diffraction peak area/alumina diffraction peak area was ⅐.

Next, 266 g of molybdenum trioxide and 111 g of cobalt carbonate were suspended in 500 ml of ion-exchanged water, and then heated at a temperature of 95° C. for 5 hours, applying a suitable reflux treatment so that the volume is not decreased, followed by dissolving of 167 g of citric acid in the suspension thereby preparing impregnating solution b. Impregnating solution b had a pH of 1.7. Impregnating solution b was subjected to the Raman spectroscopic analysis and found to have a peak intensity ratio of 3.2 (not shown, as the case may be).

After 1000 g of support b was impregnated with impregnating solution b by spray, it was dried at a temperature of 110° C. for one hour thereby producing catalyst b. The metal component contents of catalyst b were $MoO_3$ concentration 20 percent by mass and CoO concentration of 5 percent by mass, all on the catalyst b basis. Catalyst b was pre-sulfurized as with Example 1 thereby producing catalyst B. Properties of catalyst B are set forth in Table 1 below. According to a TEM photograph of catalyst B taken as with Example 1 (not shown, as the case may be), the average number of laminated layers and average length of the molybdenum disulfide layer were 1.2 and 5.0 nm, respectively.

Example 3

Preparation of Pre-Sulfurized Hydrodesulfurization Catalyst C

This example is different from Example 1 in that hydrate slurry c was prepared by adding at a constant rate to (1) a basic aluminum salt aqueous solution prepared by diluting 7.47 kg of an aqueous solution containing 22 percent by mass on an $Al_2O_3$ concentration basis of sodium aluminate with 46 kg of ion-exchanged water and adding thereto, stirring 3 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 2.23 kg of an aqueous solution containing 7 percent by mass on an $Al_2O_3$ concentration basis of aluminum sulfate with 4 kg of ion-exchanged water and a titanium mineral acid salt aqueous solution prepared by dissolving 3.18 kg of 33 percent by mass on a $TiO_2$ concentration basis of titanium sulfate in 18 kg of ion-exchanged water, until the pH was 7.2.

In the same manner as Example 1, support c was prepared from hydrate slurry c. Support c had an SiO₂ concentration of 5 percent by mass, a TiO₂ concentration of 35 percent by mass, and an Al₂O₃ concentration of 60 percent by mass, all on the support basis.

As the result of X-ray diffraction analysis carried out as with Example 1, the titania diffraction peak area/alumina diffraction peak area was ⅙.

Next, 200 g of molybdenum trioxide and 84 g of cobalt carbonate were suspended in 500 ml of ion-exchanged water, and then heated at a temperature of 95° C. for 5 hours, applying a suitable reflux treatment so that the volume is not decreased, followed by dissolving of 125 g of citric acid in the suspension thereby preparing impregnating solution c. Impregnating solution c had a pH of 1.9. Impregnating solution c had a peak intensity ratio of 2.8.

After 1000 g of support c was impregnated with impregnating solution c by spray, it was dried at a temperature of 110° C. for one hour thereby producing catalyst c. The metal component contents of catalyst c were MoO₃ concentration of 16 percent by mass and CoO concentration of 4 percent by mass, all on catalyst c basis. Catalyst c was pre-sulfurized as with Example 1 thereby producing catalyst C. Properties of catalyst C are set forth in Table 1 below. According to a TEM photograph of catalyst C taken as with Example 1, the average number of laminated layers and average length of the molybdenum disulfide layer were 1.4 and 4.3 nm, respectively.

Comparative Example 1

Preparation of Pre-Sulfurized Hydrodesulfurization Catalyst D

This example is different from Example 1 in that hydrate slurry d was prepared by adding at a constant rate to (1) a basic aluminum salt aqueous solution prepared by diluting 8.82 kg of an aqueous solution containing 22 percent by mass on an Al₂O₃ concentration basis of sodium aluminate with 34 kg of ion-exchanged water and adding thereto, stirring 1.80 kg of a solution containing 5 percent by mass on an SiO₂ concentration basis of sodium silicate, followed by heating to a temperature of 60° C. (2) an acidic aluminum salt aqueous solution prepared by diluting 13.86 kg of an aqueous solution containing 7 percent by mass on an Al₂O₃ concentration basis of aluminum sulfate with 25 kg of ion-exchanged water, until the pH was 7.2.

In the same manner as Example 1, support d was prepared from hydrate slurry d. Support d had an SiO₂ concentration of 3 percent by mass, a TiO₂ concentration of 0 percent by mass, and an Al₂O₃ concentration of 97 percent by mass, all on the support basis.

As the result of X-ray diffraction analysis carried out as with Example 1, no diffraction peak indicating the crystal structures of the anatase titania and rutile titania was detected, and the titania diffraction peak area/alumina diffraction peak area was 0.

As with Example 1, catalyst d was produced from support d and impregnating solution a. As with Example 1, catalyst d was pre-sulfurized thereby producing catalyst D. Properties of catalyst D are set forth in Table 1 below. According to a TEM photograph of catalyst D, the average number of laminated layers and average length of the molybdenum disulfide layer were 1.2 and 4.7 nm, respectively.

Comparative Example 2

Preparation of Pre-Sulfurized Hydrodesulfurization Catalyst E

This example is different from Example 1 in that hydrate slurry e was prepared by adding at a constant rate to (1) a basic aluminum salt aqueous solution prepared by diluting 7.15 kg of an aqueous solution containing 22 percent by mass on an Al₂O₃ concentration basis of sodium aluminate with 49 kg of ion-exchanged water and adding thereto, stirring 6.01 kg of a solution containing 5 percent by mass on an NaOH concentration basis of sodium hydroxide, and further adding 1.80 kg of a solution containing 5 percent by mass on an SiO₂ concentration basis of sodium silicate, stirring, followed by heating to a temperature of 60° C. (2) a titanium mineral acid salt aqueous solution prepared by dissolving 4.69 kg of 33 percent by mass on a TiO₂ concentration basis of titanium sulfate in 25.4 kg of ion-exchange water, until the pH was 7.2.

In the same manner as Example 1, support e was prepared from hydrate slurry e. Support e had an SiO₂ concentration of 3 percent by mass, a TiO₂ concentration of 50 percent by mass, and an Al₂O₃ concentration of 47 percent by mass, all on the support basis.

As the result of X-ray diffraction analysis carried out as with Example 1, the titania diffraction peak area/alumina diffraction peak area was ⅓.

As with Example 1, catalyst e was produced from support e and impregnating solution a. As with Example 1, catalyst e was pre-sulfurized thereby producing catalyst E. Properties of catalyst E are set forth in Table 1 below. According to a TEM photograph of catalyst E, the average number of laminated layers and average length of the molybdenum disulfide layer were 1.7 and 7.4 nm, respectively.

Example 4

Preparation of Pre-Sulfurized Hydrodesulfurization Catalyst F

This example is different from Example 1 in that hydrate slurry f was prepared by adding at a constant rate to (1) a basic aluminum salt aqueous solution prepared by diluting 7.79 kg of an aqueous solution containing 22 percent by mass on an Al₂O₃ concentration basis of sodium aluminate with 40 kg of ion-exchanged water and adding thereto, stirring 4.20 kg of a solution containing 5 percent by mass on an SiO₂ concentration basis of sodium silicate, followed by heating to a temperature of 60° C. (2) a mixed aqueous solution prepared by mixing an acidic aluminum salt aqueous solution prepared by diluting 6.81 kg of an aqueous solution containing 7 percent by mass on an Al₂O₃ concentration basis of aluminum sulfate with 12 kg of ion-exchanged water and a titanium mineral acid salt aqueous solution prepared by dissolving 1.82 kg of 33 percent by mass on a TiO₂ concentration basis of titanium sulfate in 10 kg of ion-exchanged water, until the pH was 7.2.

In the same manner as Example 1, support f was prepared from hydrate slurry f. Support f had an SiO₂ concentration of 7 percent by mass, a TiO₂ concentration of 20 percent by mass, and an Al₂O₃ concentration of 73 percent by mass, all on the support basis.

As the result of X-ray diffraction analysis carried out as with Example 1, the titania diffraction peak area/alumina diffraction peak area was ⅛.

Next, 232 g of molybdenum trioxide and 97 g of cobalt carbonate were suspended in 500 ml of ion-exchanged water, and then heated at a temperature of 95° C. for 5 hours, applying a suitable reflux treatment so that the volume is not decreased, followed by dissolving of 145 g of citric acid in the suspension thereby preparing impregnating solution f. Impregnating solution f had a peak intensity ratio of 2.9.

Impregnating solution f had a pH of 1.7. After 1000 g of support f was impregnated with impregnating solution f by spray, it was dried at a temperature of 110° C. for one hour thereby producing catalyst f. The metal component contents of Catalyst f were $MoO_3$ concentration of 18 percent by mass and CoO concentration of 4.5 percent by mass, all on the catalyst f basis. Catalyst f was pre-sulfurized as with Example 1 thereby producing catalyst F. Properties of catalyst F are set forth in Table 2 below. According to a TEM photograph of catalyst F, the average number of laminated layers and average length of the molybdenum disulfide layer were 1.3 and 4.4 nm, respectively.

Example 5

Preparation of Pre-Sulfurized Hydrodesulfurization Catalyst G

This example is different from Example 1 in that hydrate slurry g was prepared by adding at a constant rate to (1) a basic aluminum salt aqueous solution prepared by diluting 7.68 kg of an aqueous solution containing 22 percent by mass on an $Al_2O_3$ concentration basis of sodium aluminate with 38 kg of ion-exchanged water and adding thereto, stirring 6.00 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 8.0 kg of an aqueous solution containing 7 percent by mass on an $Al_2O_3$ concentration basis of aluminum sulfate with 14.4 kg of ion-exchanged water and a titanium mineral acid salt aqueous solution prepared by dissolving 1.36 kg of 33 percent by mass on a $TiO_2$ concentration basis of titanium sulfate in 7.64 kg of ion-exchanged water, until the pH was 7.2.

In the same manner as Example 1, support g was prepared from hydrate slurry g. Support g had an $SiO_2$ concentration of 10 percent by mass, a $TiO_2$ concentration of 15 percent by mass, and an $Al_2O_3$ concentration of 75 percent by mass, all on the support basis.

As the result of X-ray diffraction analysis carried out as with Example 1, the titania diffraction peak area/alumina diffraction peak area was ⅛.

As with Example 1, catalyst g was produced from support g and impregnating solution f. As with Example 1, catalyst g was pre-sulfurized thereby producing catalyst G. Properties of catalyst G are set forth in Table 1 below. According to a TEM photograph of catalyst G, the average number of laminated layers and average length of the molybdenum disulfide layer were 1.5 and 4.1 nm, respectively.

Comparative Example 3

Preparation of Pre-Sulfurized Hydrodesulfurization Catalyst H

This example is different from Example 1 in that hydrate slurry h was prepared by adding at a constant rate to (1) a basic aluminum salt aqueous solution prepared by diluting 7.60 kg of an aqueous solution containing 22 percent by mass on an $Al_2O_3$ concentration basis of sodium aluminate with 49 kg of ion-exchanged water, followed by heating to a temperature of 60° C. (2) a titanium mineral acid salt aqueous solution prepared by dissolving 4.09 kg of 33 percent by mass on a $TiO_2$ concentration basis of titanium sulfate in 23 kg of ion-exchanged water, until the pH was 7.2.

In the same manner as Example 1, support h was prepared from hydrate slurry h. Support h had an $SiO_2$ concentration of 0 percent by mass, a $TiO_2$ concentration of 45 percent by mass, and an $Al_2O_3$ concentration of 55 percent by mass, all on the support basis.

As the result of X-ray diffraction analysis carried out as with Example 1, the titania diffraction peak area/alumina diffraction peak area was ⅓.

As with Example 1, catalyst h was produced from support h and impregnating solution a. As with Example 1, catalyst h was pre-sulfurized thereby producing catalyst H. Properties of catalyst H are set forth in Table 2 below.

As the result of a TEM photograph analysis of catalyst G (not shown), the average number of laminated layers and average length of the molybdenum disulfide layer were 2.3 and 7.2 nm, respectively.

Comparative Example 4

Preparation of Pre-Sulfurized Hydrodesulfurization Catalyst I

This example is different from Example 1 in that hydrate slurry i was prepared by adding at a constant rate to (1) a basic aluminum salt aqueous solution prepared by diluting 5.37 kg of an aqueous solution containing 22 percent by mass on an $Al_2O_3$ concentration basis of sodium aluminate with 41 kg of ion-exchanged water and adding thereto, stirring 18 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 0.28 kg of an aqueous solution containing 7 percent by mass on an $Al_2O_3$ concentration basis of aluminum sulfate with 0.51 kg of ion-exchanged water and a titanium mineral acid salt aqueous solution prepared by dissolving 2.73 kg of 33 percent by mass on a $TiO_2$ concentration basis of titanium sulfate in 15 kg of ion-exchanged water, until the pH was 7.2.

In the same manner as Example 1, support i was prepared from hydrate slurry i. Support i had an $SiO_2$ concentration of 30 percent by mass, a $TiO_2$ concentration of 30 percent by mass, and an $Al_2O_3$ concentration of 40 percent by mass, all on the support basis.

As the result of X-ray diffraction analysis carried out as with Example 1, the titania diffraction peak area/alumina diffraction peak area was ⅛.

As with Example 1, catalyst i was produced from support i and impregnating solution a. As with Example 1, catalyst i was pre-sulfurized thereby producing catalyst I. Properties of catalyst I are set forth in Table 2 below. According to a TEM photograph of catalyst I, the average number of laminated layers and average length of the molybdenum disulfide layer were 3.0 and 7.2 nm, respectively.

Example 6

Preparation of Pre-Sulfurized Hydrodesulfurization Catalyst J

This example is different from Example 1 in that hydrate slurry j was prepared by adding at a constant rate to (1) a basic aluminum salt aqueous solution prepared by diluting 8.08 kg of an aqueous solution containing 22 percent by mass on an $Al_2O_3$ concentration basis of sodium aluminate with 42 kg of ion-exchanged water and adding thereto, stirring 1.20 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 5.90 kg of an aqueous solution containing 7 percent by mass on an $Al_2O_3$ concentration basis of aluminum sulfate with 11 kg of ion-exchanged water and a titanium mineral acid salt aqueous solution prepared by dissolving 2.27 kg of 33 percent by mass on a $TiO_2$ concentration basis of titanium sulfate in 13 kg of ion-exchanged water, until the pH was 7.2.

In the same manner as Example 1, support j was prepared from hydrate slurry j. Support j had an $SiO_2$ concentration of 2 percent by mass, a $TiO_2$ concentration of 25 percent by mass, and an $Al_2O_3$ concentration of 73 percent by mass, all on the support basis.

As the result of X-ray diffraction analysis carried out as with Example 1, the titania diffraction peak area/alumina diffraction peak area was ⅛.

Impregnating solution j was prepared in the same manner except that citric acid was changed to malic acid and had a pH of 1.5. The peak intensity ratio of impregnating solution j was 3.2.

As with Example 1, catalyst j was produced from support j and impregnating solution j. As with Example 1, catalyst j was pre-sulfurized thereby producing catalyst J. Properties of catalyst J are set forth in Table 3 below. According to a TEM photograph of catalyst J, the average number of laminated layers and average length of the molybdenum disulfide layer were 1.3 and 4.4 nm, respectively.

Example 7

Preparation of Pre-Sulfurized Hydrodesulfurization Catalyst K (1) Support j of Example 6 was used. (2) Next, 235 g of molybdenum trioxide and 98 g of cobalt carbonate were suspended in 500 ml of ion-exchanged water, and then heated at a temperature of 95° C. for 5 hours, applying a suitable reflux treatment so that the volume is not decreased, followed by dissolving of 21 g of phosphoric acid and 147 g of citric acid in the suspension thereby preparing impregnating solution k. The resulting impregnation solution k had a pH of 1.1. Impregnating solution k had a peak intensity ratio of 3.4.

After 1000 g of support j was impregnated with impregnating solution k by spray, it was dried at a temperature of 110° C. for one hour thereby producing catalyst k. The metal component contents of catalyst k were $MoO_3$ concentration of 18 percent by mass, CoO concentration of 4.5 percent by mass, and $P_2O_5$ concentration of 1.0 percent by mass, all on the catalyst k basis.

Catalyst k was pre-sulfurized as with Example 1 thereby producing catalyst K. Properties of catalyst K are set forth in Table 3 below. According to a TEM photograph of catalyst K, the average number of laminated layers and average length of the molybdenum disulfide layer were 1.3 and 4.3 nm, respectively.

Example 8

Preparation of Pre-Sulfurized Hydrodesulfurization Catalyst L (1) Support j of Example 6 was used. (2) Next, 235 g of molybdenum trioxide and 107 g of nickel carbonate were suspended in 500 ml of ion-exchanged water, and then heated at a temperature of 95° C. for 5 hours, applying a suitable reflux treatment so that the volume is not decreased, followed by dissolving of 21 g of phosphoric acid and 147 g of citric acid in the suspension thereby preparing impregnating solution l. The resulting impregnation solution l had a pH of 1.1. Impregnating solution l had a peak intensity ratio of 3.2.

After 1000 g of support j was impregnated with impregnating solution l by spray, it was dried at a temperature of 110° C. for one hour thereby producing catalyst l. The metal component contents of catalyst l were $MoO_3$ concentration of 18 percent by mass, NiO concentration of 4.5 percent by mass, and $P_2O_5$ concentration of 1.0 percent by mass, all on the catalyst l basis.

Catalyst 1 was pre-sulfurized as with Example 1 thereby producing catalyst L. Properties of catalyst L are set forth in Table 3 below. According to a TEM photograph of catalyst L, the average number of laminated layers and average length of the molybdenum disulfide layer were 1.3 and 3.7 nm, respectively.

Comparative Example 5

Preparation of Pre-Sulfurized Hydrodesulfurization Catalyst M (1) Support g of Example 5 was used. (2) Next, 492 g of molybdenum trioxide and 159 g of cobalt carbonate were suspended in 500 ml of ion-exchanged water, and then heated at a temperature of 95° C. for 5 hours, applying a suitable reflux treatment so that the volume is not decreased, followed by dissolving of 238 g of citric acid in the suspension thereby preparing impregnating solution m. The resulting impregnation solution m had a pH of 1.7. Impregnating solution m had a peak intensity ratio of 3.6.

After 1000 g of support g was impregnated with impregnating solution m by spray, it was dried at a temperature of 110° C. for one hour thereby producing catalyst m. The metal component content of catalyst m were $MoO_3$ concentration of 31 percent by mass and CoO concentration of 6 percent by mass, all on the catalyst m basis.

Catalyst m was pre-sulfurized as with Example 1 thereby producing catalyst M. Properties of catalyst M are set forth in Table 3 below. According to a TEM photograph of catalyst M, the average number of laminated layers and average length of the molybdenum disulfide layer were 2.8 and 2.8 nm, respectively.

Comparative Example 6

Preparation of Pre-Sulfurized Hydrodesulfurization Catalyst N (1) Support g of Example 5 was used. (2) Next, 390 g of ammonium molybdate and 17 g of citric acid were suspended in 500 ml of ion-exchanged water, and then heated at a temperature of 75° C. for one hour, applying a suitable reflux treatment so that the volume is not decreased, followed by dissolving of 11 g of cobalt carbonate in the suspension thereby preparing impregnating solution n. The resulting impregnation solution n had a pH of 5.3. Impregnating solution m had a peak intensity ratio of 2.2.

After 1000 g of support g was impregnated with impregnating solution n by spray, it was dried at a temperature of 110° C. for one hour thereby producing catalyst n. The metal component contents of catalyst n were $MoO_3$ concentration of 24 percent by mass and CoO concentration of 0.5 percent by mass, all on the catalyst n basis.

Catalyst n was pre-sulfurized as with Example 1 thereby producing catalyst N. Properties of catalyst N are set forth in Table 3 below. According to a TEM photograph of catalyst N, the average number of laminated layers and average length of the molybdenum disulfide layer were 2.5 and 2.6 nm, respectively.

Comparative Example 7

Preparation of Pre-Sulfurized Hydrodesulfurization Catalyst O (1) Support g of Example 5 was used. (2) Next, 391 g of molybdenum trioxide and 131 g of cobalt carbonate were suspended in 500 ml of ion-exchanged water, and then heated at a temperature of 95° C. for 5 hours, applying a suitable reflux treatment so that the volume is not decreased, followed by dissolving of 152 g of phosphoric acid in the suspension thereby preparing impregnating solution o. The resulting impregnation solution o had a pH of 0.9. Impregnating solution o had a peak intensity ratio of 3.8.

After 1000 g of support g was impregnated with impregnating solution o by spray, it was dried at a temperature of 110° C. for one hour thereby producing catalyst o. The metal component contents of catalyst were $MoO_3$ concentration of 25 percent by mass, CoO concentration of 5 percent by mass, and $P_2O_5$ concentration of 6 percent by mass all on the catalyst basis. Catalyst o was pre-sulfurized as with Example 1 thereby producing catalyst O. Properties of catalyst O are set forth in Table 3 below. According to the TEM photograph of catalyst O, the average number of laminated layers and average length of the molybdenum disulfide layer were 3.3 and 3.0 nm, respectively.

Comparative Example 8

Preparation of Pre-Sulfurized Hydrodesulfurization Catalyst P (1) Support c of Example 3 was used. (2) Next, 88 g of cobalt carbonate were suspended in 500 ml of ion-exchanged water, and then heated at a temperature of 95° C. for 5 hours, applying a suitable reflux treatment so that the volume is not decreased, followed by dissolving of 132 g of citric acid in the suspension thereby preparing impregnating solution p. The resulting impregnation solution p had a pH of 1.8.

After 1000 g of support c was impregnated with impregnating solution p by spray, it was dried at a temperature of 110° C. for one hour thereby producing catalyst p. The metal component content of catalyst p were CoO concentration of 5 percent by mass, on the catalyst p basis. Catalyst p was pre-sulfurized as with Example 1 thereby producing catalyst P. Properties of catalyst P are set forth in Table 3 below.

Example 9

Preparation of Pre-Sulfurized Hydrodesulfurization Catalyst Q

This example is different from Example 1 in that (1) in a 100 L volume tank equipped with a steam jacket, a mix aqueous solution was prepared by diluting 7.38 kg of an aqueous solution containing 7 percent by mass on an $Al_2O_3$ concentration basis of aluminum sulfate with 27 kg of ion-exchange water, adding thereto a titanium mineral acid salt aqueous solution prepared by dissolving 1.82 kg of 33 percent by mass on a $TiO_2$ concentration basis of titanium sulfate in 10 kg of ion-exchanged water, to which 1.80 kg of a solution containing 5 percent by mass on an $SiO_2$ concentration basis of sodium silicate were then added, stirring, followed by heating at a temperature of 60° C. and (2) a basic aluminum salt aqueous solution was prepared by diluting 8.16 kg of an aqueous solution containing 22 percent by mass on an $Al_2O_3$ concentration basis of sodium aluminate with 28 kg of ion-exchanged water and heated to a temperature of 60° C., and this basic aluminum salt aqueous solution was added at a constant rate (addition time: 10 minutes) into the tank containing therein the mix aqueous solution using a roller pump until the pH was 7.2 thereby preparing hydrate slurry q containing silica, titania, and alumina.

In the same manner as Example 1, support q was prepared from hydrate slurry q. Support q had an $SiO_2$ concentration of 3 percent by mass, a $TiO_2$ concentration of 20 percent by mass, and an $Al_2O_3$ concentration of 77 percent by mass, all on the support basis.

As the result of X-ray diffraction analysis carried out as with Example 1 (not shown), the titania diffraction peak area/alumina diffraction peak area was $\frac{1}{7}$.

As with Example 1, catalyst q was produced from support q and impregnating solution f. As with Example 1, catalyst Q was produced from catalyst q. Properties of catalyst Q are set forth in Table 3 below. According to a TEM photograph of catalyst Q, the average number of laminated layers and average length of the molybdenum disulfide layer were 1.3 and 4.4 nm, respectively.

[Test 1]

Crude oil having the following properties was hydrotreated with a hydrodesulfurization unit manufactured by ZYTEL Co. using Catalysts A to Q. The boiling point range of the crude oil was measured in accordance with the method described in JIS K2254 "Petroleum products-Determination of distillation characteristics". The density at 15° C. was measured in accordance with JIS K 2249 "Crude petroleum and petroleum products-Determination of density and petroleum measurement tables based on a reference temperature (15° C.)". The sulfur content was measured in accordance with JIS K 2541 "Crude oil and petroleum products-Determination of sulfur content". The nitrogen content was measured in accordance with JIS K 2609 "Crude petroleum and petroleum products-Determination of nitrogen content".

A temperature at which the produced oil has a sulfur content of 7 ppm by mass (hereinafter referred to as "reaction temperature") is determined to compare the desulfurization performance among the catalysts. Hydrotreating reaction was carried out under the following conditions. The results are set forth in Tables 1 to 3.

[Properties of Crude Oil]
Feedstock: straight run gas oil (boiling point range of 208 to 390° C.)
Density at 15° C.: 0.8493 g/cm³
Sulfur content: 1.32 percent by mass
Nitrogen content: 105 ppm by mass
[Reaction Conditions]
Liquid-space velocity: 1.0 h$^{-1}$
Hydrogen pressure: 4.5 MPa
Hydrogen/oil ratio: 250 NL/L

TABLE 1

|  |  | Example 1 | Example 2 | Example 3 | Comparative Example 1 | Comparative Example 2 |
|---|---|---|---|---|---|---|
| Catalyst |  | Catalyst A Support a Impregnating Solution a | Catalyst B Support b Impregnating Solution b | Catalyst C Support c Impregnating Solution c | Catalyst D Support d Impregnating Solution a | Catalyst E Support e Impregnating Solution a |
| Support Components (Support basis) |  |  |  |  |  |  |
| silica | mass % | 3 | 1 | 5 | 3 | 3 |
| titania | mass % | 20 | 10 | 35 | 0 | 50 |
| alumina | mass % | 77 | 89 | 60 | 97 | 47 |
| Loaded Components (On hydrodesulfurization catalyst prior to pre-sulfurization basis) |  |  |  |  |  |  |
| $MoO_3$ | mass % | 19 | 20 | 16 | 19 | 19 |
| $C_oO$ | mass % | 4.5 | 5 | 4 | 4.5 | 4.5 |
| $P_2O_5$ | mass % | 0 | 0 | 0 | 0 | 0 |
| Chelating Agent |  | Citric Acid | Citric Acid | Citric Acid | Citric Acid | Citric Acid |
| Peak Intensity Ratio |  | 3.1 | 3.2 | 2.8 | 3.1 | 3.1 |
| Average Length of Molybdenum Disulfide Layer | nm | 4.8 | 5 | 4.3 | 4.7 | 7.4 |
| Average Number of Laminated Layer of Molybdenum Disulfide Layer |  | 1.3 | 1.2 | 1.4 | 1.2 | 1.7 |
| Disulfurization Performance (Reaction Temperature) | °C. | 340 | 348 | 344 | 362 | 357 |

TABLE 2

|  |  | Example 4 | Example 5 | Comparative Example 3 | Comparative Example 4 |
|---|---|---|---|---|---|
| Catalyst |  | Catalyst F Support f Impregnating Solution f | Catalyst G Support g Impregnating Solution f | Catalyst H Support h Impregnating Solution a | Catalyst I Support i Impregnating Solution a |
| Support Components (Support basis) |  |  |  |  |  |
| silica | mass % | 7 | 10 | 0 | 30 |
| titania | mass % | 20 | 15 | 45 | 30 |
| alumina | mass % | 73 | 75 | 55 | 40 |
| Loaded Components (On hydrodesulfurization catalyst prior to pre-sulfurization basis) |  |  |  |  |  |
| $MoO_3$ | mass % | 18 | 18 | 19 | 19 |
| $C_oO$ | mass % | 4.5 | 4.5 | 4.5 | 4.5 |
| $P_2O_5$ | mass % | 0 | 0 | 0 | 0 |
| Chelating Agent |  | Citric Acid | Citric Acid | Citric Acid | Citric Acid |
| Peak Intensity Ratio |  | 2.9 | 2.9 | 3.1 | 3.1 |
| Average Length of Molybdenum Disulfide Layer | nm | 4.4 | 4.1 | 7.2 | 7.2 |
| Average Number of Laminated Layer of Molybdenum Disulfide Layer |  | 1.3 | 1.5 | 2.3 | 3 |
| Desulfurization Performance (Reaction Temperature) | °C. | 345 | 350 | 358 | 360 |

TABLE 3

|  |  | Example 6 | Example 7 | Example 8 | Comparative Example 5 |
|---|---|---|---|---|---|
| Catalyst |  | Catalyst J Support j Impregnating Solution j | Catalyst K Support j Impregnating Solution k | Catalyst L Support j Impregnating Solution l | Catalyst M Support g Impregnating Solution m |
| Support Components (Support basis) |  |  |  |  |  |
| silica | mass % | 2 | 2 | 2 | 10 |
| titania | mass % | 25 | 25 | 25 | 15 |
| alumina | mass % | 73 | 73 | 73 | 75 |

TABLE 3-continued

| Loaded Components (On hydrodesulfurization catalyst prior to pre-sulfurization basis) | | | | | |
|---|---|---|---|---|---|
| $M_aO_3$ | mass % | 18 | 18 | 18 | 31 |
| NiO | mass % | 0 | 0 | 4.5 | 0 |
| $C_oO$ | mass % | 4.5 | 4.5 | 0 | 6 |
| $P_2O_5$ | mass % | 0 | 1 | 1 | 0 |
| Chelating Agent | | Malic Acid | Citric Acid | Citric Acid | Citric Acid |
| Peak Intensity Ratio | | 3.2 | 3.4 | 3.2 | 3.6 |
| Average Length of Molybdenum Disulfide Layer | nm | 4.4 | 4.3 | 3.7 | 2.8 |
| Average Number of Laminated Layer of Molybdenum Disulfide Layer | | 1.3 | 1.3 | 1.3 | 2.8 |
| Desulfurization Performance (Reaction Temperature) | ° C. | 344 | 340 | 343 | 361 |

| | | Comparative Example 6 | Comparative Example 7 | Comparative Example 8 | Example 9 |
|---|---|---|---|---|---|
| Catalyst | | Catalyst N Support g Impregnating Solution n | Catalyst O Support g Impregnating Solution o | Catalyst P Support c Impregnating Solution p | Catalyst Q Support q Impregnating Solution f |
| Support Components (Support basis) | | | | | |
| silica | mass % | 10 | 10 | 5 | 3 |
| titania | mass % | 15 | 15 | 35 | 20 |
| alumina | mass % | 75 | 75 | 60 | 77 |
| Loaded Components (On hydrodesulfurization catalyst prior to pre-sulfurization basis) | | | | | |
| $M_aO_3$ | mass % | 24 | 25 | 0 | 18 |
| NiO | mass % | 0 | 0 | 0 | 0 |
| $C_oO$ | mass % | 0.5 | 5 | 5 | 4.5 |
| $P_2O_5$ | mass % | 0 | 6 | 0 | 0 |
| Chelating Agent | | Citric Acid | — | Citric Acid | Citric Acid |
| Peak Intensity Ratio | | 2.2 | 3.8 | — | 2.9 |
| Average Length of Molybdenum Disulfide Layer | nm | 2.6 | 3.0 | — | 4.4 |
| Average Number of Laminated Layer of Molybdenum Disulfide Layer | | 2.5 | 3.3 | — | 1.3 |
| Desulfurization Performance (Reaction Temperature) | ° C. | 355 | 357 | — | 344 |

Table 1 sets forth the results of influences of the varied amounts of titania in the support. An increase in the titania amount in the support enhances the desulfurization performance. However, when the amount was in excess of 40 percent by mass, the performance was deteriorated due to the poor sharpness of the pore distribution. When the amount of titania is 0 percent by mass, the catalyst does not have any effect by titania and was reduced in desulfurization performance.

Table 2 sets forth the results of influences of the varied amounts of silica in the support. When the silica amount in the support was in excess of 10 percent by mass, the catalyst was deteriorated in performance due to the poor sharpness of the pore distribution. When the amount of silica is 0 percent by mass, the catalyst was reduced in performance due to less dispersiveness of titania.

Table 3 sets forth the results of influences of variations in metal components to be loaded. Both nickel-molybdenum and cobalt-molybdenum exhibited an excellent desulfurization performance. The results showed that the catalysts comprising metal components together with a chelating agent and/or phosphoric acid had an excellent desulfurization performance. For the support production, both the method wherein an acid solution was added to a basic solution and the method wherein a basic solution was added to an acid solution provide successfully catalysts having an excellent desulfurization performance. However, the catalysts that were increased in the amount of the metal components, short in molybdenum disulfide layers and highly laminated were poor in desulfurization performance. Furthermore, the catalyst prepared from the impregnating solution which was increased in peak intensity at 900 cm$^{-1}$ in the Raman spectrum, depending on the monomer, i.e., the catalyst which is lower than the defined peak ratio was also poor in performance due to an increased interaction between the molybdenum disulfide containing more monomer and the support. The catalyst prepared from the impregnating solution with no chelating agent was poor in desulfurization performance due to the molybdenum disulfide that was highly laminated. The catalyst containing no molybdenum as a metal component failed to reduce the sulfur concentration in the produced oil to 7 ppm by mass even when the temperature reached the maximum temperature at which the apparatus can measure the sulfur content and thus the measurement was terminated.

From the above results, the catalysts of the present invention were found to be low in a temperature at which the sulfur content of the produced oil was 7 ppm by mass and to be excellent in desulfurization activity. The support used in the present invention comprises inexpensive alumina as the main component and thus does not increase significantly the production cost, compared with conventional alumina- or alumina-silica-based catalysts. The catalyst of the present invention is inexpensive and excellent in performances.

[Preparation of Catalyst R]

Support a of Example 1 was used. Next, 232 g of molybdenum trioxide and 97 g of cobalt carbonate were suspended in 500 ml of ion-exchanged water, and then heated at a temperature of 95° C. for 5 hours, applying a suitable reflux treatment so that the volume is not decreased, followed by dissolving of 145 g of malic acid in the suspension thereby preparing impregnating solution r. After 1000 g of support a was impregnated with impregnating solution r by spray, it was dried at a temperature of 110° C. for one hour thereby producing catalyst R. The metal component contents of catalyst R were $MoO_3$ concentration of 18 percent by mass and CoO concentration of 4.5 percent by mass, all on the basis of the catalyst prior to pre-sulfurization (hereinafter, refer to "on the basis of catalyst Y"). Properties of catalyst R are set forth in Table 4.

[Preparation of Catalyst S]

Support a of Example 1 was used. Next, 235 g of molybdenum trioxide and 98 g of cobalt carbonate were suspended in 500 ml of ion-exchanged water, and then heated at a temperature of 95° C. for 5 hours, applying a suitable reflux treatment so that the volume is not decreased, followed by dissolving of 21 g of phosphoric acid and 147 g of citric acid in the suspension thereby preparing impregnating solution s. After 1000 g of support a was impregnated with impregnating solution s by spray, it was dried at a temperature of 110° C. for one hour thereby producing catalyst S. The metal component contents of catalyst S were $MoO_3$ concentration of 18 percent by mass, Coo concentration of 4.5 percent by mass and $P_2O_5$ concentration of 1.0 percent by mass, all on the basis of catalyst Y. Properties of catalyst S are set forth in Table 4.

[Preparation of Catalyst T]

Support a of Example 1 was used. Next, 235 g of molybdenum trioxide and 107 g of nickel carbonate were suspended in 500 ml of ion-exchanged water, and then heated at a temperature of 95° C. for 5 hours, applying a suitable reflux treatment so that the volume is not decreased, followed by dissolving of 21 g of phosphoric acid and 147 g of citric acid in the suspension thereby preparing impregnating solution t. After 1000 g of support a was impregnated with impregnating solution t by spray, it was dried at a temperature of 110° C. for one hour thereby producing catalyst T. The metal component contents of catalyst T were $MoO_3$ concentration of 18 percent by mass, NiO concentration of 4.5 percent by mass and $P_2O_5$ concentration of 1.0 percent by mass, all on the basis of catalyst Y. Properties of catalyst T are set forth in Table 4.

[Preparation of Catalyst U]

This is different from Example 1 in that hydrate slurry u was prepared by adding at a constant rate to a basic aluminum salt aqueous solution prepared by diluting 8.82 kg of an aqueous solution containing 22 percent by mass on an $Al_2O_3$ concentration basis of sodium aluminate with 34 kg of ion-exchanged water and adding thereto, stirring 1.80 kg of a solution containing 5 percent by mass on an $SiO_2$ concentration basis of sodium silicate, followed by heating to a temperature of 60° C., an acidic aluminum salt aqueous solution prepared by diluting 13.86 kg of an aqueous solution containing 7 percent by mass on an $Al_2O_3$ concentration basis of aluminum sulfate with 25 kg of ion-exchanged water, until the pH was 7.2.

In the same manner as Example 1, support u was prepared from hydrate slurry u. Support u had an $SiO_2$ concentration of 3 percent by mass, a $TiO_2$ concentration of 0 percent by mass, and an $Al_2O_3$ concentration of 97 percent by mass, all on the support basis.

As the result of X-ray diffraction analysis carried out as with Example 1 (not shown), the titania diffraction peak area/alumina diffraction peak area was 0.

As with Example 1, catalyst U was produced from support u and impregnating solution r. The metal component contents of catalyst U were $MoO_3$ concentration of 18 percent by mass and CoO concentration of 4.5 percent by mass, all on the basis of catalyst Y. Properties of catalyst U are set forth in Table 4.

[Preparation of Catalyst V]

Catalyst V was prepared using catalyst a and preparation method of Example 1 except that malic acid was not used for impregnating solution r. Properties of catalyst V are set forth in Table 4.

[Preparation Catalyst W]

This is different from Example 1 in that hydrate slurry w was prepared by adding at a constant rate to a basic aluminum salt aqueous solution prepared by diluting 7.09 kg of an aqueous solution containing 22 percent by mass on an $Al_2O_3$ concentration basis of sodium aluminate with 47 kg of ion-exchanged water and adding thereto, stirring 1.80 kg of a solution containing 5 percent by mass on an $SiO_2$ concentration basis of sodium silicate, followed by heating to a temperature of 60° C., a titanium mineral acid salt aqueous solution prepared by dissolving 4.09 kg of 33 percent by mass on a $TiO_2$ concentration basis of titanium sulfate in 23 kg of ion-exchanged water, until the pH was 7.2.

In the same manner as Example 1, support w was prepared from hydrate slurry w. Support w had an $SiO_2$ concentration of 3 percent by mass, a $TiO_2$ concentration of 45 percent by mass, and an $Al_2O_3$ concentration of 52 percent by mass, all on the support basis.

As the result of X-ray diffraction analysis carried out as with Example 1 (not shown), the titania diffraction peak area/alumina diffraction peak area was ⅓.

As with Example 1, catalyst W was produced from support w and impregnating solution w (produced by changing the amount of molybdenum trioxide in impregnating solution r from 232 g to 256 g). The metal component contents of catalyst W were $MoO_3$ concentration of 20 percent by mass and CoO concentration of 4.5 percent by mass, all on the basis of catalyst Y. Properties of catalyst W are set forth in Table 4.

Example 10

Into a circulation type fixed bed reactor were filled 200 ml of Catalyst R. Pre-sulfurization was completed by feeding a mix oil of a straight-run gas oil and dimethyl disulfide, the sulfur content of which was adjusted to 2.0 percent by weight from room temperature and keeping it at a pressure of 5.0 MPa, a liquid-space velocity of 2.0 $h^{-1}$, a hydrogen/oil ratio of 200 NL/L, and a reaction temperature of 250° C. for 8 hours and further keeping it at a temperature of 320° C. for another 5 hours.

A TEM photograph of catalyst R (pre-sulfurized hydrodesulfurization catalyst R) after pre-sulfurization was taken with a transmission electron microscope H-800 manufactured by Hitachi, Ltd., and then 50 molybdenum layers were observed therefrom. For each molybdenum disulfide layer, the number of laminated layers and length were measured to calculate the average number of laminated layers and average length (as the case may be). The definitions of the number of laminated layers N and length L of molybdenum disulfide are shown in FIG. 2. The pre-sulfurized hydrodesulfurization catalyst contained molybdenum disulfide having an average number of laminated layers of 1.3 and an average length of 4.4 nm.

After pre-sulfurization, the feedstock was switched to a straight-run gas oil (a boiling point of 220 to 385° C., a sulfur content of 1.27 percent by mass) and then the desulfurization activity of the catalyst was evaluated at a pressure of 6.0 MPa, a liquid-space velocity of 1.5 $h^{-1}$, a hydrogen/oil ratio of 200 NL/L, and a reaction temperature of 340° C. (hydrorefining experiment). The sulfur content of the produced oil is set forth in Table 4.

Example 11

As with Example 10 except for using catalyst S instead of catalyst R, the same pre-sulfurization and desulfurization activity evaluation were carried out. The pre-sulfurized hydrodesulfurization catalyst contained molybdenum disulfide having an average number of laminated layers of 1.3 and an average length of 4.3 nm. The sulfur content of the produced oil is set forth in Table 4.

Example 12

As with Example 10 except for using catalyst T instead of catalyst R, the same pre-sulfurization and desulfurization activity evaluation were carried out. The pre-sulfurized hydrodesulfurization catalyst contained molybdenum disulfide having an average number of laminated layers of 1.3 and an average length of 3.7 nm. The sulfur content of the produced oil is set forth in Table 4.

Comparative Example 9

As with Example 10 except for using catalyst U instead of catalyst R, the same pre-sulfurization and desulfurization activity evaluation were carried out. The pre-sulfurized hydrodesulfurization catalyst contained molybdenum disulfide having an average number of laminated layers of 1.2 and an average length of 4.7 nm. The sulfur content of the produced oil is set forth in Table 4.

Comparative Example 10

As with Example 10 except for using catalyst V instead of catalyst R, the same pre-sulfurization and desulfurization activity evaluation were carried out. The pre-sulfurized hydrodesulfurization catalyst contained molybdenum disulfide having an average number of laminated layers of 2.8 and an average length of 7.2 nm. The sulfur content of the produced oil is set forth in Table 4.

Comparative Example 11

As with Example 10 except for using catalyst W instead of catalyst R, the same pre-sulfurization and desulfurization activity evaluation were carried out. The pre-sulfurized hydrodesulfurization catalyst contained molybdenum disulfide having an average number of laminated layers of 1.8 and an average length of 7.1 nm. The sulfur content of the produced oil is set forth in Table 4.

Comparative Example 12

As with Example 10 except for keeping the catalyst at a temperature of 410° C. for 5 hours instead of at a temperature of 320° C. for 5 hours for pre-sulfurization, the same pre-sulfurization and desulfurization activity evaluation were carried out. The pre-sulfurized hydrodesulfurization catalyst contained molybdenum disulfide having an average number of laminated layers of 3.8 and an average length of 4.5 nm. The sulfur content of the produced oil is set forth in Table 4.

Example 13

As with Example 10 except for carrying out the desulfurization activity evaluation at a pressure of 3.7 MPa, a liquid-space velocity of 0.5 h$^{-1}$, a hydrogen/oil ratio of 180 NL/L, and a reaction temperature of 320° C., the same pre-sulfurization and desulfurization activity evaluation were carried out. The pre-sulfurized hydrodesulfurization catalyst contained molybdenum disulfide having an average number of laminated layers of 1.3 and an average length of 4.4 nm. The sulfur content of the produced oil is set forth in Table 4.

Comparative Example 13

As with Example 13 except for using catalyst W, the same pre-sulfurization and desulfurization activity evaluation were carried out. The pre-sulfurized hydrodesulfurization catalyst contained molybdenum disulfide having an average number of laminated layers of 1.8 and an average length of 7.1 nm. The sulfur content of the produced oil is set forth in Table 4.

Example 14

As with Example 10 except for using a mix oil (a sulfur content of 1.05 percent by weight) of 80 percent by weight of a straight-run gas oil and 20 percent by weight of a fluid catalytic cracking straight-run gas oil (a boiling point of 170 to 360° C., a sulfur content of 0.19 percent by mass), the same pre-sulfurization and desulfurization activity evaluation were carried out. The pre-sulfurized hydrodesulfurization catalyst contained molybdenum disulfide having an average number of laminated layers of 1.3 and an average length of 4.4 nm. The sulfur content of the produced oil is set forth in Table 4.

Comparative Example 14

As with Example 14 except for using catalyst U, the same pre-sulfurization and desulfurization activity evaluation were carried out. The pre-sulfurized hydrodesulfurization catalyst contained molybdenum disulfide having an average number of laminated layers of 1.2 and an average length of 4.7 nm. The sulfur content of the produced oil is set forth in Table 4.

Comparative Example 15

As with Example 14 except for using catalyst V, the same pre-sulfurization and desulfurization activity evaluation were carried out. The pre-sulfurized hydrodesulfurization catalyst contained molybdenum disulfide having an average number of laminated layers of 2.8 and an average length of 7.2 nm. The sulfur content of the produced oil is set forth in Table 4.

Comparative Example 16

As with Example 14 except for using catalyst W, the same pre-sulfurization and desulfurization activity evaluation were carried out. The pre-sulfurized hydrodesulfurization catalyst contained molybdenum disulfide having an average number of laminated layers of 1.8 and an average length of 7.1 nm. The sulfur content of the produced oil is set forth in Table 4.

TABLE 4

|  |  | Example 10 | Example 11 | Example 12 | Comparative Example 9 | Comparative Example 10 | Comparative Example 11 | Comparative Example 12 |
|---|---|---|---|---|---|---|---|---|
| Catalyst |  | R | S | T | U | V | W | R |
| Support Components (Support basis) |  |  |  |  |  |  |  |  |
| silica | mass % | 3 | 3 | 3 | 3 | 3 | 3 | 3 |
| titania | mass % | 20 | 20 | 20 | 0 | 20 | 45 | 20 |
| alumina | mass % | 77 | 77 | 77 | 97 | 77 | 52 | 77 |

TABLE 4-continued

| Loaded Components (On hydrodesulfurization catalyst prior to pre-sulfurization basis) | | | | | | | | |
|---|---|---|---|---|---|---|---|---|
| MoO$_3$ | mass % | 18 | 18 | 18 | 18 | 18 | 20 | 18 |
| NiO | mass % | 0 | 0 | 4.5 | 0 | 0 | 0 | 0 |
| CoO | mass % | 4.5 | 4.5 | 0 | 4.5 | 4.5 | 4.5 | 4.5 |
| P$_2$O$_5$ | mass % | 0 | 1 | 1 | 0 | 0 | 0 | 0 |
| Chelating Agent | | Malic Acid | Citric Acid | Citric Acid | Malic Acid | — | Malic Acid | Malic Acid |
| Average Length of Molybdenum Disulfide Layer | nm | 4.4 | 4.3 | 3.7 | 4.7 | 7.2 | 7.1 | 4.5 |
| Average Number of Laminated Layer of Molybdenum Disulfide Layer | | 1.3 | 1.3 | 1.3 | 1.2 | 2.8 | 1.8 | 3.8 |
| Titania Diffraction Peak Area/Alumina Diffraction Peak Area | | 1/8 | 1/8 | 1/8 | 0 | 1/8 | 1/3 | 1/8 |
| Sulfur Content of Produced Oil | mass ppm | 10 | 9 | 4 | 68 | 39 | 26 | 21 |

| | | Example 13 | Comparative Example 13 | Example 14 | Comparative Example 14 | Comparative Example 15 | Comparative Example 16 |
|---|---|---|---|---|---|---|---|
| Catalyst | | R | W | R | U | V | W |
| Support Components (Support basis) | | | | | | | |
| silica | mass % | 3 | 3 | 3 | 3 | 3 | 3 |
| titania | mass % | 20 | 45 | 20 | 0 | 20 | 45 |
| alumina | mass % | 77 | 52 | 77 | 97 | 77 | 52 |
| Loaded Components (On hydrodesulfurization catalyst prior to pre-sulfurization basis) | | | | | | | |
| MoO$_3$ | mass % | 18 | 20 | 18 | 18 | 18 | 20 |
| NiO | mass % | 0 | 0 | 0 | 0 | 0 | 0 |
| CoO | mass % | 4.5 | 4.5 | 4.5 | 4.5 | 4.5 | 4.5 |
| P$_2$O$_5$ | mass % | 0 | 0 | 0 | 0 | 0 | 0 |
| Chelating Agent | | Malic Acid | Malic Acid | Malic Acid | Malic Acid | — | Malic Acid |
| Average Length of Molybdenum Disulfide Layer | nm | 4.4 | 7.1 | 4.4 | 4.7 | 7.2 | 7.1 |
| Average Number of Laminated Layer of Molybdenum Disulfide Layer | | 1.3 | 1.8 | 1.3 | 1.2 | 2.8 | 1.8 |
| Titania Diffraction Peak Area/Alumina Diffraction Peak Area | | 1/8 | 1/3 | 1/8 | 0 | 1/8 | 1/3 |
| Sulfur Content of Produced Oil | mass ppm | 8 | 22 | 7 | 52 | 29 | 16 |

The results in Table 4 indicate that high desulfurization activity can be achieved using a hydrorefining catalyst comprising at least one type of metal component selected from VIA and VIII groups of the periodic table, supported together with a chelating agent on a silica-alumina-titania support wherein the total area of the diffraction peak area indicating the crystal structure of anatase titania (101) planes and the diffraction peak area indicating the crystal structure of rutile titania (110) planes in the support, measured by X-ray diffraction analysis is ¼ or less of the diffraction peak area indicating the aluminum crystal structure assignable to γ-alumina (400) planes and having been pre-sulfurized to have a molybdenum disulfide layer having an average length of longer than 3.5 nm and 7 nm or shorter and an average number of laminated layers of more than 1.0 and 1.9 or fewer.

INDUSTRIAL APPLICABILITY

The pre-sulfurized catalyst of the present invention exhibit high desulfurization activity for hydrorefining of a gas oil fraction in particular, and thus is significantly used in the industry because it can hydrorefine hydrocarbon oil at a higher level.

The invention claimed is:

1. A hydrodesulfurization catalyst for hydrocarbon oils, comprising a hydrodesulfurization catalyst Y comprising a support containing silica, alumina, and titania and at least one type of metal component supported thereon and selected from VIB and VIII groups of the periodic table, the catalyst Y being pre-sulfurized, the total area (titania diffraction peak area) of the diffraction peak area indicating the crystal structure of anatase titania (101) planes and the diffraction peak area indicating the crystal structure of rutile titania (110) planes in the support, measured by X-ray diffraction analysis being ¼ or less of the diffraction peak area (alumina diffraction peak area) indicating the aluminum crystal assigned to γ-alumina (400) planes, the metal component comprising at least molybdenum, the molybdenum being formed into molybdenum disulfide crystal and disposed in layers on the support by the pre-sulfurization and the molybdenum disulfide crystal layers having an average length between 3.5 nm and 7 nm in the plane direction and an average number of laminated layers between 1.0 and 1.9, wherein the support contains silica in the form of SiO$_2$ in an amount of 1 to 10 percent by mass, titania in the form of TiO$_2$ in an amount of 15 to 40 percent by mass, and alumina in the form of Al$_2$O$_3$ in an amount of 50 percent by mass or more.

2. A hydrodesulfurization catalyst according to claim 1, wherein the content of the metal component is from 1 to 35 percent by mass on the hydrodesulfurization catalyst Y prior to the pre-sulfurization basis, and the content of the molybdenum is from 1 to 25 percent by mass in the form of MoO$_3$ on the hydrodesulfurization catalyst Y prior to the pre-sulfurization basis.

3. A hydrodesulfurization catalyst according to claim 1, wherein said pre-sulfurization is carried out by contacting the hydrodesulfurization catalyst Y with a mix oil of a hydrocarbon oil and a sulfating agent or hydrogen sulfide at a temperature of 200 to 400° C.

4. A method for hydrorefining a hydrocarbon oil comprising hydrotreating a hydrocarbon oil under a hydrogen atmosphere using the hydrodesulfurization catalyst according to claim 1.

5. A method for hydrorefining hydrocarbon oils according to claim 4, wherein said hydrocarbon oil is selected from the group consisting of straight-run gas oil, vacuum gas oil, light cycle oil, hydrocracked gas oil, and thermal-cracked gas oil.

6. A method for hydrorefining hydrocarbon oils according to claim 4, wherein the oil produced from the hydrotreating of a hydrocarbon oil has a sulfur content of 10 ppm by mass or less and a nitrogen content of 3 ppm by mass or less.

7. A method for hydrorefining hydrocarbon oils according to claim 4, wherein the reaction pressure is from 1 to 12 MPa, the liquid-space velocity is from 0.1 to 4.0 $h^{-1}$, the hydrogen/oil ratio is from 80 to 500 NL/L and the reaction temperature is from 250 to 400° C.

8. A process of producing an uncalcined hydrodesulfurization catalyst for hydrocarbon oil, comprising:
   (1) a first step of mixing a basic aluminum salt aqueous solution and a mixed aqueous solution of a titanium mineral acid salt and an acidic aluminum salt in the presence of silicate ion so that the pH is from 6.5 to 9.5 to produce a hydrate;
   (2) a second step of producing a support by washing, extruding, drying, and calcining the hydrate in turn;
   (3) a third step of contacting the support with an impregnating solution containing at least one type of metal component selected from VIB and VIII groups of the periodic table (provided that molybdenum is indispensably contained) and a chelating agent;
   (4) a fourth step of drying the support with the metal supported thereon, produced by contacting the support with the impregnating solution to produce an uncalcined hydrodesulfurization catalyst Y; and
   (5) a fifth step of pre-sulfurizing the uncalcined hydrodesulfurization catalyst Y, the total area (titania diffraction area) of the diffraction peak area indicating the crystal structure of anatase titania (101) planes and the diffraction peak area indicating the crystal structure of rutile titania (110) planes in the support, measured by X-ray diffraction analysis being ¼ or less of the diffraction peak area (alumina diffraction peak area) indicating the aluminum crystal structure assigned to γ-alumina (400) planes, the molybdenum being formed into molybdenum disulfide crystal and disposed in layers on the support by the pre-sulfurization, and the molybdenum disulfide crystal layers having an average length between 3.5 nm and 7 nm in the plane direction and an average number of laminated layers between 1.0 and 1.9, the impregnating solution having a peak intensity in the range of 940 to 950 $cm^{-1}$ 2.5 times or more of the peak intensity in the range of 890 to 910 $cm^{-1}$ in the Raman spectrum.

9. A process of producing an uncalcined hydrodesulfurization catalyst according to claim 8, wherein the pre-sulfurization of the fifth step is carried out by contacting the uncalcined hydrodesulfurization catalyst Y with a mix oil of a hydrocarbon oil and a sulfating agent or hydrogen sulfide at a temperature of 200 to 400° C.

10. A process of producing an uncalcined hydrodesulfurization catalyst according to claim 8, wherein said impregnating solution further contains a phosphoric compound.

11. A process of producing an uncalcined hydrodesulfurization catalyst according to claim 8, wherein said chelating agent is citric or malic acid.

12. The process according to claim 8, wherein the drying in step (4) is performed at a temperature of 200° C. or lower for 0.5 to 3 hours.

* * * * *